United States Patent [19]
Heusler et al.

[11] 3,883,517
[45] May 13, 1975

[54] 8-OXO-5-THIA-1-AZABICYCLO(4,2,0)OCT-2-ENE COMPOUNDS

[75] Inventors: Karl Heusler, Basel; Hans Bickel, Binningen; Bruno Fechtig, Reinach, Basel-Land; Heinrich Peter, Riehen; Riccardo Scartazzini, Allschwil, all of Switzerland

[73] Assignee: Ciba-Geigy Corporation, Ardsley, N.Y.

[22] Filed: June 2, 1971

[21] Appl. No.: 149,341

[30] Foreign Application Priority Data
June 5, 1970  Switzerland.......................... 8470/70

[52] U.S. Cl.......... 260/243 C; 424/246; 260/239.1; 260/239 A; 260/332.2 A
[51] Int. Cl. ..................... C07d 99/24; C07d 99/16
[58] Field of Search ................................ 260/243 C

[56] References Cited
UNITED STATES PATENTS

| | | | |
|---|---|---|---|
| 3,422,099 | 1/1969 | Crast................................ | 260/243 C |
| 3,487,074 | 12/1969 | Sheehan........................... | 260/243 C |
| 3,644,347 | 2/1972 | Webber et al. .................. | 260/243 C |
| 3,646,024 | 2/1972 | Holdrege......................... | 260/243 C |
| 3,655,658 | 4/1972 | Godtfredsen.................... | 260/243 C |

*Primary Examiner*—Nicholas S. Rizzo
*Attorney, Agent, or Firm*—Joseph G. Kolodny; John J. Maitner

[57] ABSTRACT

The invention concerns 7-amino-2,2-dimethyl-ceph-3-em-4-carboxylic acid derivatives, especially their N-acyl derivatives. They are prepared by oxidizing the carbinol group in N-protected α-[3β-amino-4β-(2-hydroxymethyl-2-propylthio)-2-oxo-1-azetidinyl]-α-phosphoranylidene-acetic acid derivatives to a formyl group.

9 Claims, No Drawings

8-OXO-5-THIA-1-AZABICYCLO(4,2,0)OCT-2-ENE COMPOUNDS

The subject of the present invention are 7-amino-8-oxo-5-thia-1-azabicyclo[4,2,0]-oct-2-ene-2-carboxylic acid compounds, especially 7-amino-ceph-3-em-4-carboxylic acid compounds of the formula

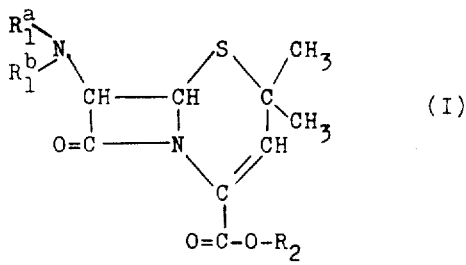

wherein $R_1{}^a$ represents hydrogen or an amino protective group $R_1{}^A$, and $R_1{}^b$ represents hydrogen or an acyl group Ac, or $R_1{}^A$ and $R_1{}^b$ together denote a bivalent amino protective group, and $R_2$ represents hydrogen or a radical $R_2{}^A$ which together with the $-C(=O)-O-$ grouping forms a protected carboxyl group, or salts of such compounds which have salt-forming groups.

An amino protective group $R_1{}^A$ is a group which is replaceable by hydrogen, above all an acyl group Ac, and also a triarylmethyl group, especially the trityl group, as well as an organic silyl group, and also an organic stannyl group. A group Ac above all represents the acyl radical of an organic carboxylic acid or sulphonic acid, in particular the acyl radical of an optionally substituted aliphatic, cycloaliphatic, cycloaliphatic-aliphatic, aromatic, araliphatic, heterocyclic or heterocyclic-aliphatic carboxylic acid, (including formic acid), and also the acyl radical of a carbonic acid half-derivative.

A bivalent amino protective group formed by the radicals $R_1{}^A$ and $R_1{}^b$ together is, in particular, the bivalent acyl radical of an organic dicarboxylic acid, above all the diacyl radical of an aliphatic or aromatic dicarboxylic acid, and also the acyl radical of an α-aminoacetic acid which is preferably substituted in the α-position, for example, containing an aromatic or heterocyclic radical, wherein the amino group is bonded to the nitrogen atom via a methylene radical which is preferably substituted, for example by two lower alkyl groups, such as methyl groups. The radicals $R_1{}^A$ and $R_1{}^b$ can together also represent an organic ylidene radical, such as an aliphatic, cycloaliphatic, cycloaliphatic-aliphatic or araliphatic ylidene radical.

A protected carboxyl group of the formula $-C(=O)-O-R_2{}^A$ is above all an esterified carboxyl group, but can also be an anhydride group, which is usually a mixed anhydride group.

The group $R_2{}^A$ can represent an organic radical, which together with the $-C(=O)-O-$ grouping forms an esterified carboxyl group which can preferably be split easily; such radicals are, for example, aliphatic, cycloaliphatic, cycloaliphatic-aliphatic, aromatic or araliphatic radicals, especially optionally substituted hydrocarbon radicals of this nature, as well as heterocyclic or heterocyclic-aliphatic radicals.

The group $R_2{}^A$ can also represent an organic silyl radical, as well as an organo-metallic radical, such as an appropriate organic stannyl radical, especially a silyl or stannyl radical substituted by 1 to 3, optionally substituted, hydrocarbon radicals, such as aliphatic hydrocarbon radicals.

A radical $R_2{}^A$ which forms a - preferably mixed - anhydride group with the $-C(=O)-O-$ grouping is preferably the acyl radical of an organic carboxylic acid, such as an aliphatic, cycloaliphatic, cycloaliphatic-aliphatic, aromatic or araliphatic carboxylic acid, or of a carbonic acid half-derivative, such as of a carbonic acid half-ester.

The general terms used in the preceding and following description for example have the following meanings:

An aliphatic radical, including the aliphatic radical of a corresponding organic carboxylic acid or sulphonic acid, as well as a corresponding ylidene radical, is an optionally substituted, monovalent or divalent, aliphatic hydrocarbon radical, especially lower alkyl, as well as lower alkenyl or lower alkinyl, and also lower alkylidene, which can, for example, contain up to 7, preferably up to 4, carbon atoms. Such radicals can optionally be monosubstituted, disubstituted or polysubstituted by functional groups, for example, by free, etherified or esterified hydroxyl or mercapto groups, such as lower alkoxy, lower alkenyloxy, lower alkylenedioxy, optionally substituted phenyloxy or phenyl-lower alkoxy, lower alkylthio or optionally substituted phenylthio or phenyl-lower alkylthio, lower alkoxycarbonyloxy or lower alkanoyloxy, or halogen, and also by oxo, nitro, optionally substituted amino, for example di-lower alkylamino, lower alkyleneamino, oxa-lower alkyleneamino or aza-lower alkyleneamino, as well as acylamino, such as lower alkanoylamino, optionally substituted carbamoylamino, ureidocarbonylamino or guanidinocarbonylamino, azido, acyl, such as lower alkanoyl or benzoyl, optionally functionally modified carboxyl, such as carboxyl present in the salt form, esterified carboxyl, such as lower alkoxycarbonyl, optionally substituted carbamoyl, such as N-lower alkylcarbamoyl or N,N-di-lower alkylcarbamoyl, and also optionally substituted ureidocarbonyl or guanidinocarbonyl, or nitrile, optionally functionally modified sulpho, such as sulphamoyl, or sulpho present in the salt form.

The divalent aliphatic radical of an aliphatic carboxylic acid is, for example, lower alkylene or lower alkenylene, which can optionally be monosubstituted, disubstituted or polysubstituted, for example like an aliphatic radical indicated above.

A cycloaliphatic or cycloaliphatic-aliphatic radical, including the cycloaliphatic or cycloaliphatic-aliphatic radical in a corresponding organic carboxylic acid or sulphonic acid, or a corresponding cycloaliphatic or cycloaliphatic-aliphatic ylidene radical, is an optionally substituted, monovalent or divalent, cycloaliphatic or cycloaliphatic-aliphatic, hydrocarbon radical, for example, monocyclic, bicyclic or polycyclic cycloalkyl or cycloalkenyl, also cycloalkylidene, or cycloalkyl or cycloalkenyl-lower alkyl or cycloalkenyl-lower alkenyl, as well as cycloalkyl-lower alkylidene or cycloalkenyl-lower alkylidene, wherein cycloalkyl and cycloalkylidene for example contains up to 12, such as 3-8, preferably 3-6, ring carbon atoms, whilst cycloalkenyl for example possesses up to 12, such as 3-8, for example 5-8, preferably 5 or 6, ring carbon atoms, as well as 1 to 2 double bonds, and the aliphatic part of a cycloaliphatic-aliphatic radical can, for example, contain up to 7, preferably up to 4, carbon atoms. The above cycloaliphatic or cycloaliphatic-aliphatic radicals can, if desired, be monosubstituted, disubstituted or polysubstituted, for example by optionally substituted aliphatic hydrocarbon radicals, such as by the abovementioned, optionally substituted lower alkyl groups, or, for example like the abovementioned aliphatic hydrocarbon radicals, by functional groups.

The aromatic radical, including the aromatic radical of a corresponding carboxylic acid or sulphonic acid, is an optionally substituted aromatic hydrocarbon radical, for example a monocyclic, bicyclic or polycyclic aromatic hydrocarbon radical, in particular phenyl, as well as biphenylyl or naphthyl, which can optionally be monosubstituted, disubstituted or polysubstituted, for example like the abovementioned aliphatic and cycloaliphatic hydrocarbon radicals.

The divalent aromatic radical of an aromatic carboxylic acid is above all a 1,2-arylene, especially 1,2-phenylene, which can optionally be monosubstituted, disubstituted or polysubstituted, for example like the abovementioned aliphatic and cycloaliphatic hydrocarbon radicals.

The araliphatic radical, including the araliphatic radical in a corresponding carboxylic acid or sulphonic acid, and also an araliphatic ylidene radical, is, for example, an optionally substituted araliphatic hydrocarbon radical, such as an optionally substituted aliphatic hydrocarbon radical which, for example, possess up to three, optionally substituted, monocyclic, bicyclic or polycyclic aromatic hydrocarbon radicals, and above all represent phenyl-lower alkyl or phenyl-lower alkenyl, as well as phenyl-lower alkinyl and also phenyl-lower alkylidene, and such radicals, for example, contain 1–3 phenyl groups and can optionally be monosubstituted, disubstituted or polysubstituted in the aromatic and/or aliphatic part, for example like the abovementioned aliphatic and cycloaliphatic radicals.

Heterocyclic groups, including those in heterocyclic-aliphatic radicals, including heterocyclic or heterocyclic-aliphatic groups in corresponding carboxylic acids or sulphonic acids, are especially monocyclic, as well as bicyclic or polycyclic, azacyclic, thiacyclic, oxacyclic, thiazacyclic, thiadiazacyclic, oxazacyclic, diazacyclic, triazacyclic or tetrazacyclic radicals of aromatic character, and also corresponding partially or wholly saturated radicals, and these heterocyclic radicals can optionally be monosubstituted, disubstituted or polysubstituted, for example like the abovementioned cycloaliphatic radicals. The aliphatic part in heterocyclic-aliphatic radicals for example has the meaning given for the corresponding cycloaliphatic-aliphatic or araliphatic radicals.

The acyl radical of a carbonic acid half-derivative is preferably the acyl radical or a corresponding half-ester, wherein the organic radical of the ester group represents an optionally substituted aliphatic, cycloaliphatic, aromatic or araliphatic hydrocarbon radical or a heterocyclic-aliphatic radical, above all the acyl radical of a lower alkyl half-ester, which is optionally substituted, for example in the α-position or β-position, of carbonic acid, and of a lower alkenyl, cycloalkyl, phenyl or phenyl-lower alkyl half-ester of carbonic acid which is optionally substituted in the organic radical. Acyl radicals of a carbonic acid half-ester are, further, corresponding radicals of lower alkyl half-esters of carbonic acid, in which the lower alkyl part contains a heterocyclic group, for example one of the abovementioned heterocyclic groups of aromatic character, and both the lower alkyl radical and the heterocyclic group can optionally be substituted. The acyl radical of a carbonic acid half-derivative can also represent an optionally N-substituted carbamoyl group, such as an optionally halogenated carbamoyl group.

Lower alkyl is, for example, methyl, ethyl, n-propyl, isopropyl, n-butyl, isobutyl, sec.-butyl or tert.-butyl, as well as n-pentyl, isopentyl, n-hexyl, isohexyl or n-heptyl, whilst lower alkenyl can, for example, be vinyl, allyl, isopropenyl, 2- or 3-metallyl or 3-butenyl, lower alkinyl can, for example, be propargyl or 2-butinyl, and lower alkylidene can, for example, be isopropylidene or isobutylidene.

Lower alkylene is, for example, 1,2-ethylene, 1,2-or 1,3-propylene or 1,4-butylene, whilst lower alkenylene is, for example, 1,2-ethylene.

Cycloalkyl is, for example, cyclopropyl, cyclobutyl, cyclopentyl, cyclohexyl or cycloheptyl, as well as adamantyl, cycloalkenyl is, for example, 2-cyclopentyl, 2- or 3-cyclopentenyl, 1-, 2- or 3-cyclohexenyl, 3-cycloheptenyl or 1,4-cyclohexadienyl, and cycloalkylidene is, for example, cyclopentylidene or cyclohexylidene. Cycloalkyl-lower alkyl or cycloalkyl-lower alkenyl is, for example, cyclopropyl-, cyclopentyl-, cyclohexyl- or cycloheptyl-methyl, -1,1- or -1,2-ethyl, -1,1-, -1,2- or -1,3-propyl, -vinyl or -allyl, whilst cycloalkenyl-lower alkyl or cycloalkenyl-lower alkenyl for example represents 1-, 2- or 3-cyclopentenyl-, 1-, 2- or 3-cyclohexenyl- or 1-, 2- or 3-cycloheptenyl-methyl, -1,1- or -1,2-ethyl, -1,1-, -1,2- or -1,3-propyl, -vinyl or -allyl. Cycloalkyl-lower alkylidene is, for example, cyclohexylmethylene, and cycloalkenyl-lower alkylidene is, for example, 3-cyclo-hexenylmethylene.

Naphthyl is 1- or 2-naphthyl, whilst biphenylyl for example represents 4-biphenylyl.

Phenyl-lower alkyl or phenyl-lower alkenyl is, for example, benzyl, 1- or 2-phenylethyl, 1-, 2- or 3-phenylpropyl, diphenylmethyl, trityl, 1- or 2-naphthylmethyl, styryl or cinnamyl, and phenyl-lower alkylidene is, for example, benzylidene.

Heterocyclic radicals are above all optionally substituted heterocyclic radicals of aromatic character, for example appropriate monocyclic, monoazacyclic, monothiacyclic or monooxacyclic radicals, such as pyrryl, for example 2-pyrryl or 3-pyrryl, pyridyl, for example 2-, 3- or 4-pyridyl, and also pyridinium, thienyl, for example 2-thienyl, or furyl, for example 2-furyl, bicyclic monoazacyclic, monooxacyclic or monothiacyclic radicals, such as indolyl, for example 2- or 3-indolyl, quinolinyl, for example 2- or 4-quinolinyl, isoquinolinyl, for example 1-isoquinolinyl, benzofuranyl, for example 2- or 3-benzofuranyl, or benzothienyl, for example 2- or 3-benzothienyl, monocyclic diazacyclic, triazacyclic, tetrazacyclic, thiazacyclic, thiadiazacyclic or oxazacyclic radicals, such as imidazolyl, for example 2-imidazolyl, pyrimidinyl, for example 2- or 4-pyrimidinyl, triazolyl, for example 1,2,4-triazol-3-yl, tetrazolyl, for example 1- or 5-tetrazolyl, oxazolyl, for example 2-oxazolyl, isoxazolyl, for example 3-isoxazolyl, thiazolyl, for example 2-thiazolyl, isothiazolyl, for example 3-isothiazolyl or 1,2,4- or 1,3,4-thiadiazolyl, for example, 1,2,4-thiadiazol- 3-yl or 1,3,4,-thiadiazol-2-yl, or bicyclic diazacyclic, thiazacyclic or oxazacyclic radicals, such as benzimidazolyl, for example 2-bemzimidazolyl, benzoxazolyl, for example 2-benzoxazolyl or benzthiazolyl, for example 2- benzthiazolyl. Corresponding partially or wholly saturated radicals are, for example, tetrahydrothienyl, such as 2-tetrahydrothienyl, tetrahydrofuryl, such as 2-tetrahydrofuryl, or piperidyl, for example 2- or 4-piperidyl. Heterocyclic-aliphatic radicals are heterocyclic groups, especially those mentioned above, which contain lower alkyl or lower alkenyl. The abovementioned heterocyclyl radicals can be substituted, for example by optionally substituted aliphatic hydrocarbon radicals, especially lower alkyl, such as methyl, or, for example like the aliphatic hydrocarbon radicals, by functional groups.

Lower alkoxy is, for example, methoxy, ethoxy, n-propoxy, isopropoxy, n-butoxy, isobutoxy, sec.-butoxy, tert.-butoxy, n-pentoxy or tert.-pentoxy. These groups can be substituted, for example as in halogeno-lower alkoxy, especially 2-halogeno-lower alkoxy, for example 2,2,2-trichloroethoxy, 2-bromoethoxy or 2-iodoethoxy. Lower alkenyloxy is, for example, vinyloxy or allyloxy, lower alkylenedioxy is, for example, methylenedioxy, ethylenedioxy or isopropylidenedioxy, cycloalkoxy is, for example, cyclopentoxy, cyclohexoxy or adamantyloxy, phenyl-lower alkoxy, for example benzyloxy or 1- or 2-phenylethoxy, or hetero-cyclyloxy or heterocyclyl-lower alkoxy, for example pyridyl-lower alkoxy, such as 2-pyridylmethoxy, furyl-lower alkoxy, such as furfuryloxy, or thienyl-lower alkoxy, such as 2-thenyloxy.

Lower alkylthio is, for example methylthio, ethylthio or n-butylthio, lower alkenylthio is, for example allylthio, and phenyl-lower alkylthio is, for example benzylthio, whilst mercapto groups etherified by heterocyclyl radicals or heterocyclyl-aliphatic radicals are, especially, imidazolylthio, for example 2-imidazolylthio, thiazolylthio, for example 2-thiazolylthio, 1,2,4- or 1,3,4-thiadiazolylthio, for example 1,2,4-thiadiazol-3-ylthio or 1,3,4-thiadiazol-2-ylthio, or tetrazolylthio, for example 1-methyl-5-tetrazolylthio.

Esterified hydroxyl groups are, above all, halogen, for example fluorine, chlorine, bromine or iodine, as well as lower alkanoyloxy, for example acetoxy or propionyloxy.

Lower alkoxy-carbonyl is, for example, methoxycarbonyl, ethoxycarbonyl, n-propoxycarbonyl, isopropoxycarbonyl, tert.-butoxycarbonyl or tert.-pentoxycarbonyl.

N-lower alkyl-carbamoyl or N,N-di-lower alkylcarbamoyl is, for example N-methylcarbamoyl, N-ethylcarbamoyl, N,N-dimethylcarbamoyl or N,N-diethylcarbamoyl, whilst N-lower alkylsulphamoyl for example represents N-methylsulphamoyl or N,N-dimethylsulphamoyl.

A carboxyl or sulpho group present in the alkali metal salt form is, for example, a carboxyl or sulpho group present in the sodium salt or potassium salt form.

Lower alkylamino or di-lower alkylamino is, for example, methylamino, ethylamino, dimethylamino or diethylamino, lower alkyleneamino is, for example, pyrrolidino or piperidino, oxa-lower alkyleneamino is, for example, morpholino, and aza-lower alkyleneamino is, for example, piperazino or 4-methylpiperazino. Acylamino especially represents carbamoylamino, lower alkylcarbamoylamino, such as methylcarbamoylamino, ureidocarbonylamino, guanidinocarbonylamino, lower alkanoylamino, such as acetylamino or propionylamino, and also phthalimido, or sulphoamino which is optionally present in the salt form, such as the alkali metal, for example sodium, salt form or ammonium salt form.

Lower alkanoyl is, for example, acetyl or propionyl.

Lower alkenyloxycarbonyl is, for example, vinyloxycarbonyl, whilst cycloalkoxycarbonyl and phenyl-lower alkoxycarbonyl for example represents adamantyloxycarbonyl, benzyloxycarbonyl, diphenylmethoxycarbonyl or α-4-biphenylyl-α-methylethoxycarbonyl. Lower alkoxycarbonyl, wherein lower alkyl for example contains a monocyclic, monoazacyclic, monooxacyclic, or monothiacyclic group, is, for example, furyl-lower alkoxycarbonyl, such as furfuryloxycarbonyl, or thienyl-lower alkoxycarbonyl, for example thenyloxycarbonyl.

An acyl group Ac in particular represents an acyl radical of an organic carboxylic acid or of a carbonic acid half-derivative, the acyl radical being contained in a naturally occurring or biosynthetically, semi-synthetically or totally-synthetically preparable, preferably pharmacologically active, N-acyl derivative of 6-amino-penicillanic acid or 7-amino-cephalosporanic acid compounds, or represents an easily removable acyl radical, especially of a carbonic acid half-derivative.

An acyl radical Ac contained in pharmacologically active N-acyl derivatives of 6-amino-penicillanic acid or 7-amino-cephalosporanic acid is, above all, a group of the formula

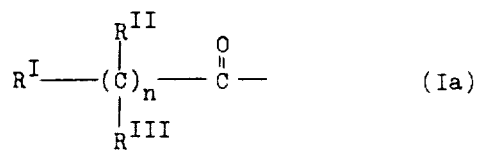

wherein $n$ represents 0 and $R'$ denotes hydrogen or an optionally substituted cycloaliphatic or aromatic hydrocarbon radical, or an optionally substituted heterocyclic radical, preferably of aromatic character, a functionally modified, preferably etherified hydroxyl or mercapto group or an optionally substituted amino group, or wherein $n$ represents 1, and $R'$ represents hydrogen or an optionally substituted, aliphatic, cycloaliphatic, cycloaliphatic-aliphatic, aromatic or araliphatic hydrocarbon radical or an optionally substituted heterocyclic or heterocyclic-aliphatic radical, wherein the heterocyclic radical preferably possesses aromatic character and/or a quaternary nitrogen atom, or represents an optionally functionally modified, preferably etherified or esterified, hydroxyl or mercapto group, an optionally functionally modified carboxyl group, an acyl group, an optionally substituted amino group or an azido group, and each of the radicals $R''$ and $R'''$ is hydrogen, or wherein $n$ represents 1, $R'$ represents an optionally substituted aliphatic, cycloaliphatic, cycloaliphatic-aliphatic, aromatic or araliphatic hydrocarbon radical or an optionally substituted heterocyclic or heterocyclic-aliphatic radical, wherein the heterocyclic radical preferably displays aromatic character, $R''$ denotes an optionally functionally modified, preferably etherified, hydroxyl or mercapto group, an optionally substituted amino group, an optionally functionally modified carboxyl or sulfo group, an azido group or a halogen atom, and $R'''$ represents hydrogen, or wherein $n$ represents 1, each of the radicals $R'$ and $R''$ denote a functionally modified, preferably etherified or esterified, hydroxyl group, or an optionally functionally modified carboxyl group, and $R'''$ represents hydrogen, or wherein $n$ represents 1, $R'$ denotes hydrogen or an optionally substituted aliphatic, cycloaliphatic, cycloaliphatic-aliphatic, aromatic or araliphatic hydrocarbon radical, and $R''$ and $R'''$ together represent an optionally substituted aliphatic, cycloaliphatic, cycloaliphatic-aliphatic or araliphatic hydrocarbon radical bonded to the carbon atom by a double bond, or wherein n represents 1 and $R'$ denotes an optionally substituted aliphatic, cycloaliphatic, cycloaliphatic-aliphatic, aromatic or araliphatic hydrocarbon radical or an optionally substituted heterocyclic or heterocyclic-aliphatic radical, wherein heterocyclic radicals preferably possess aromatic character, $R''$ denotes an optionally substituted aliphatic, cycloaliphatic, cycloaliphatic-aliphatic, aromatic or araliphatic hydrocarbon radical and $R'''$ denotes hydrogen or an optionally substituted aliphatic, cycloaliphatic, cycloaliphatic-aliphatic, aromatic or araliphatic hydrocarbon radical.

In the abovementioned acyl groups of the formula Ia, for example, n represents O and $R'$ represents hydrogen or a cycloalkyl group with 5–7 carbon atoms which is optionally substituted, for example in the 1-position by amino or by a sulphoamino group which is optionally in the salt form, for example alkali metal salt form, a phenyl, naphthyl or tetrahydronaphthyl group which is optionally substituted, preferably by hydroxyl, lower alkoxy, for example methoxy, and/or halogen, for example chlorine, a heterocyclic group which is optionally substituted, for example by lower alkyl and/or phenyl groups, which can in turn carry substituents such as halogen, for example chlorine, or an amino group which is preferably N-substituted, for example by an optionally substituted lower alkyl radical, such as a lower alkyl radical containing halogen, for example chlorine, or $n$ represents 1 and $R'$ represents a lower alkyl group which is optionally substituted, preferably by phenyloxy optionally substituted by halogen, such as chlorine, such as phenyloxy containing hydroxyl and/or halogen, for example chlorine, amino and/or carboxyl, a lower alkenyl group, a phenyl group which is optionally substituted, such as a phenyl group containing hydroxyl, halogen, for example chlorine and/or optionally substitued phenyloxy, a pyridyl, pyridinium, thienyl, 1-imidazolyl or 1-tetrazolyl group which is optionally substituted, for example by amino or aminomethyl, an optionally substituted lower alkoxy group, a phenyloxy group which is optionally substituted, for example by hydroxyl and/or halogen, such as chlorine, a lower alkylthio or lower alkenylthio group, an optionally substituted, for example lower alkyl-substituted, such as methyl-substituted, phenylthio, 2-imidazolylthio, 1,2,4-triazol-3-ylthio, 1,3,4-triazol-2-ylthio 1,2,4-thiadiazol-3-ylthio, such as 5-methyl-1,2,4-thiadiazol-3-ylthio, 1,3,4-thiadiazol-2-ylthio, such as 5-methyl-1,3,4-thiadiazol-2-ylthio, or 5-tetrazolylthio, such as 1-methyl-5-tetrazolylthio group, a halogen atom, especially chlorine or bromine atom, an optionally functionally modified carboxyl group, such as a lower alkoxycarbonyl group, a nitrile group, or a carbamoyl group which is optionally N-substituted, for example by phenyl, an optionally substituted lower alkanoyl or benzoyl group, or an azido group, and $R''$ and $R'''$ represent hydrogen, or n represents 1, $R'$ represents a phenyl or thienyl group which is optionally substituted, for example by hydroxyl and/or halogen, for example chlorine, and also represent a 1,4-cyclohexadienyl group, $R''$ represents an optionally substituted amino group, for example optionally substituted carbamoylamino group or a sulphoamino group present in the salt form, for example alkali metal salt form, an azido group, a carboxyl group optionally present in the salt form, for example alkali metal salt form, or in the esterified form, a nitrile group, a sulfogroup, an optionally substituted lower alkoxy or phenyloxy group, or a halogen atom, and $R'''$ represents hydrogen, or n represents 1, $R'$ and $R''$ each represent halogen, for example bromine, or lower alkoxycarbonyl, for example methoxycarbonyl, and $R'''$ represents hydrogen, or n represents 1, and each of the groups $R'$, $R''$ and $R'''$ represent lower alkyl, for example methyl.

Such acyl radicals Ac are, for example, formyl, cyclopentylcarbonyl, α-aminocyclopentylcarbonyl or α-aminocyclohexylcarbonyl (with an optionally substituted amino group, for example a sulphoamino group optionally present in the salt form, or an amino group substituted by an acyl radical which can preferably be split off easily, for example on treatment with an acid agent, such as trifluoroacetic acid, or with a chemical reducing agent, such as zinc in the presence of aqueous acetic acid, or by an acyl radical which can be converted into such a radical, preferably a suitable acyl radical of a carbonic acid half-ester, such as 2,2,2-trichloroethyloxycarbonyl, 2-bromoethoxycarbonyl, 2-iodoethoxycarbonyl, tert.-butoxycarbonyl or phenacyloxycarbonyl, or of a carbonic acid half-amide, such as carbamoyl or N-methylcarbamoyl), 2,6-dimethoxybenzoyl, tetrahydronaphthoyl, 2-methoxynaphthoyl, 2-ethoxy-naphthoyl, benzyloxycarbonyl, hexahydrobenzyloxycarbonyl, 5-methyl-3-phenyl-4-isoxazolylcarbonyl, 3-(2-chlorophenyl)-5-methyl-4-isoxazolylcarbonyl, 3-(2,6-dichlorophenyl)-5-methyl-4-isoxazolylcarbonyl, 2-chloroethylaminocarbonyl, acetyl, propionyl, butyryl, hexanoyl, octanoyl, acrylyl, crotonoyl, 3-butenoyl, 2-pentenoyl, methoxyacetyl, methylthioacetyl, butylthioacetyl, allylthioacetyl, chloroacetyl, bromoacetyl, dibromoacetyl, 3-chloropropionyl, 3-bromopropionyl, aminoacetyl or 5-amino-5-carboxylvaleryl (with an amino group which is optionally substituted, for example as indicated, and/or a carboxyl group which is optionally functionally modified, and is, for example, in the salt form, such as the sodium salt form, or in the ester form, such as a lower alkyl ester form, for example methyl or ethyl ester form), azidoacetyl, carboxyacetyl, methoxycarbonylacetyl, ethoxycarbonylacetyl, bis-methoxycarbonylacetyl, N-phenylcarbamoylacetyl, cyanoacetyl, α-cyanopropionyl, 2-cyano-3,3-dimethylacrylyl, phenylacetyl, α-bromophenylacetyl, α-azidophenylacetyl, 3-chlorophenylacetyl, 4-aminomethylphenylacetyl, (with an amino group which is optionally substituted, for example as indicated), phenacylcarbonyl, phenyloxyacetyl, 4-trifluoromethylphenyloxyacetyl, benzyloxyacetyl, phenylthioacetyl, bromophenylthioacetyl, 2-phenyloxypropionyl, α-phenyloxyphenylacetyl, α-methoxyphenylacetyl, α-ethoxyphenylacetyl, α-methoxy-3,4-dichlorophenylacetyl, α-cyanophenylacetyl, phenylglycyl, 4-hydroxyphenylglycyl, 3-chloro-4-hydroxyphenylglycyl or 3,5-dichloro-4-hydroxyphenylglycyl (with an amino group which is optionally substituted, for example as indicated above), benzylthioacetyl, benzylthiopropionyl, α-carboxyphenylacetyl (with a carboxyl group which is optionally functionally modified, for example as indicated above), 3-phenylpropionyl, 3-(3-cyanophenyl)-propionyl, 4-(3-methoxyphenyl)-butyryl, 2-pyridylacetyl, 4-aminopyridiniumacetyl (optionally with an amino group which is substituted, for example as indicated above), 2-thienylacetyl, 2-tetrahydrothienylacetyl, α-carboxy-2-thienylacetyl or α-carboxy-3-thienylacetyl (optionally with a carboxyl group which is functionally modified, for example as indicated above), α-cyano-2-thienylacetyl, α-amino-2-thienylacetyl or α-amino-3-thienylacetyl (optionally with an amino group which is substituted, for example as indicated above), α-sulfophenylacetyl (in which the sulfo group may be functionally modified, e.g. as the carboxyl group), 3-thienylacetyl, 2-furylacetyl, 1-imidazolylacetyl, 1-tetrazolylacetyl, 3-methyl-2-imidazolylthioacetyl, 1,2,4-triazol-3-ylthioacetyl, 1,3,4-triazol-2-ylthioacetyl, 5-methyl-1,2,4-thiadiazol-3-ylthioacetyl, 5-methyl-1,3,4-thiadiazol-2-ylthioacetyl or 1-methyl-5-tetrazolylthioacetyl.

An easily removable acyl radical Ac, especially of a carbonic acid half-ester, is above all an acyl radical of a half-ester of carbonic acid which can be split off by reduction, for example by treatment with a chemical reducing agent, or by treatment with acid, for example with trifluoroacetic acid, such as a lower alkoxycarbonyl radical which preferably shows multiple branching in the α-position or is substituted by acylcarbonyl, especially benzoyl radicals, or substituted by halogen atoms in the β-position, for example tert.-butoxycarbonyl, tert.-pentoxycarbonyl, phenacyloxycarbonyl,2,2,2-trichloroethoxycarbonyl or 2-iodoethoxycarbonyl or a radical which can be converted into the latter, such as 2-chloroethoxycarbonyl or 2-bromoethoxycarbonyl, and also preferably polycyclic cycloalkoxycarbonyl, for example adamantyloxycarbonyl, optionally substituted phenyl-lower alkoxycarbonyl, above all α-phenyl-lower alkoxycarbonyl, wherein the α-position preferably has several substitutents, for example diphenylmethoxycarbonyl or α-4-biphenylyl-α-methylethoxycarbonyl, or furyl-lower alkoxycarbonyl, above all α-furyl-lower alkoxycarbonyl, for example furfuryloxycarbonyl.

A divalent acyl group formed by the two radicals $R_1^A$ and $R_1^b$ is, for example, the acyl radical of a lower alkanedicarboxylic acid or lower alkenedicarboxylic acid, such as succinyl, or of an o-aryldicarboxylic acid, such as phthaloyl.

A further divalent radical formed by the groups $R_1^A$ and $R_1^b$ is, for example, a 1,1-di-lower alkyl-4-oxo-2-aza-1,4-butylene radical which, especially in the 3-position, contains, for example, an optionally substituted phenyl or thienyl, for example 1,1-dimethyl-3-phenyl-4-oxo-2-aza-1,4-butylene radical.

An organic radical $R_2^4$ which together with the —C(=O)—O— grouping forms an esterified carboxyl group which can preferably be split easily, for example represents a 2-halogeno-lower alkyl radical $R_2^a$, wherein halogen has an atomic weight of above 19. Such a radical together with the —C(=O)—O— grouping forms an esterified carboxyl group which can easily be split on treatment with chemical reducing agents under neutral or weakly acid conditions, for example with zinc in the presence of aqueous acetic acid, or forms an esterified carboxyl group which can easily be converted into such a carboxyl group, and is, for example, 2,2,2-trichloroethyl, 2-chloroethyl, 2-bromoethyl or 2-iodoethyl.

A further group $R_2^4$, which together with the —C(=O)—O— grouping forms an esterified carboxyl group which can also be split easily on treatment with chemical reducing agents under neutral or weakly acid conditions, for example on treatment with zinc in the presence of aqueous acetic acid, is an arylcarbonylmethyl group $R_2^b$, wherein aryl especially represents an optionally substituted phenyl group, and preferably phenacyl.

The group $R_2^4$ can also represent the radical $R_2^c$, which denotes an arylmethyl group, wherein aryl especially represents a monocyclic, preferably substituted, aromatic hydrocarbon radical. Such a radical together with the —C(=O)—O— grouping forms an esterified carboxyl group which can easily be split on irradiation, preferably with ultraviolet light, under neutral or acid conditions. Such an aryl radical contains, as substituents, especially lower alkoxy, for example methoxy (which in the case of the preferred phenyl radical are above all in the 3-, 4- and/or 5-position), and/or above all nitro (in the case of the preferred phenyl radical, preferably in the 2-position). Such radicals $R_2^c$ are, above all, 3- or 4-methoxybenzyl, 3,5-dimethoxybenzyl, 2-nitrobenzyl or 4,5-dimethoxy-2-nitrobenzyl.

A group $R_2^4$ can also represent the radical $R_2^d$, which together with the —C(=O)—O— grouping forms an esterified carboxyl group which can easily be split under acid conditions, for example on treatment with trifluoroacetic acid or formic acid. Such a radical $R_2^d$ is above all a methyl group, which is polysubstituted by optionally substituted hydrocarbon radicals, or is monosubstituted by a carbocyclic aryl group possessing electron-donating substituents or by a heterocyclic group of aromatic character possessing oxygen or sulphur atoms as a ring member, or $R_2^d$ denotes a ring member in a polycycloaliphatic hydrocarbon radical, or denotes the ring member which is in the α-position to the oxygen atom or sulphur atom in an oxacycloaliphatic or thiacycloaliphatic radical.

Preferred polysubstituted methyl groups $R_2^d$ are, for example, tert.-butyl, tert.-pentyl, benzhydryl, 4,4'-dimethoxy-benzhydryl or 2-(4-biphenylyl)-2-propyl, whilst a methyl group $R_2^d$ containing the abovementioned substituted aryl or the heterocyclic group is, for example, 4-methoxybenzyl or 3,4-dimethoxybenzyl, or 2-furyl. A polycycloaliphatic hydrocarbon radical in which the methyl group $R_2^d$ represents a preferably triply branched ring member is, for example, adamantyl, such as 1-adamantyl, and an abovementioned oxacycloaliphatic or thiacycloaliphatic radical $R_2^d$ is a 2-tetrahydrofuryl, 2-tetrahydropyranyl or 2,3-dihydro-2-pyranyl or corresponding sulphur analogues.

The radical $R_2^4$ can also represent a radical $R_2^3$, which together with the —C(=O)—O— grouping forms an esterified carboxyl group which can be split hydrolytically, for example under weakly basic or weakly acid conditions. Such a radical $R_2^3$ is preferably a radical which together with the —C(=O)—O— grouping forms an activated ester, such as nitrophenyl, for example 4-nitrophenyl or 2,4-dinitrophenyl, nitrophenyl-lower alkyl, for example 4-nitrobenzyl, polyhalogenophenyl, for example 2,4,6-trichlorophenyl or 2,3,4,5,6-pentachlorophenyl, and also cyanomethyl, as well as acylaminomethyl, for example phthaliminomethyl or succinyliminomethyl.

The group $R_2^A$ can also represent a radical $R_2^f$ which together with the carboxyl grouping —C(=O)—O— forms an esterified carboxyl group which can be split under hydrogenolytic conditions, and is, for example, an optionally substituted α-aryl-lower alkyl radical, such as benzyl, 4-methoxy-benzyl, 4-nitrobenzyl, benzhydryl or 4,4-dimethoxybenzhydryl.

The group $R_2^A$ can also represent a radical $R_2^g$ which together with the carboxyl grouping —C(=O)—O— forms an esterified carboxyl group which can be split under physiological conditions, above all lower alkanoyloxymethyl, for example acetoxymethyl.

A silyl radical or stannyl radical $R_2^A$ preferably contains optionally substituted aliphatic, cycloaliphatic, aromatic or araliphatic hydrocarbon radicals, such as lower alkyl, cycloalkyl, phenyl or phenyl-lower alkyl groups, and above all represents tri-lower alkylsilyl, for example trimethylsilyl, or tri-lower alkylstannyl, for example tri-n-butylstannyl.

An acyl radical which together with the —C(=O)—O— grouping forms a mixed anhydride group which can be split, preferably hydrolytically, is, for example, the acyl radical of one of the abovementioned organic carboxylic acids or carbonic acid half-derivatives, such as lower alkanoyl, for example ethyl, or lower alkoxycarbonyl, for example ethoxycarbonyl.

Salts are, in particular, those of the compounds of the formula I in which $R^2$ represent hydrogen, and are above all metal salts or ammonium salts, such as alkali metal salts and alkaline earth metal salts, for example sodium, potassium, magnesium or calcium salts, as well as ammonium salts with ammonia or suitable organic amines, for which, above all, aliphatic, cycloaliphatic, cycloaliphatic-aliphatic and araliphatic primary, secondary or tertiary monoamines, diamines or polyamines, as well as heterocyclic bases can be used to form salts, such amines being lower alkylamines, for example triethylamine, hydroxy-lower alkylamines, for example 2-hydroxyethylamine, bis-(2-hydroxyethyl)-amine or tri-(2-hydroxyethyl)-amine, basic aliphatic esters of carboxylic acids, for example 4-aminobenzoic acid-2-diethylamino-ethyl ester, lower alkyleneamines, for example 1-ethylpiperidine, cycloalkylamines, for example bicyclohexylamine, or benzylamines, for example N,N'-dibenzylethylenediamine, and also bases of the pyridine type, for example pyridine, collidine or quinoline. Compounds of the formula I, in which, for example, $R_1^a$ and $R_1^b$ represent hydrogen or which possess a basic group in a radical $R_1^a$ and $R_1^b$, can also form acid addition salts, for example with inorganic acids, such as hydrochloric acid, sulphuric acid or phosphoric acid, or with suitable organic carboxylic acids or sulphonic acids, for example trifluoroacetic acid. Compounds of the formula I, wherein $R_2$ represents hydrogen, and in which $R_1^a$ and $R_1^b$ denote hydrogen, or which contain a basic group in a radical $R_1^a$ and $R_1^b$, can also be present in the form of an internal salt, that is to way in the form of the zwitter ion.

The compounds of the formula I display valuable pharmacological properties or can be used as intermediate products for the manufacture of compound showing such properties. Compounds of the formula I, wherein $R_1^a$ represents an acyl radical Ac occurring in pharmacologically active N-acyl derivatives of 6-amino-penam-3-carboxylic acid compounds or 7-amino-ceph-3-em-4-carboxylic acid compounds, and $R_1^b$ represents hydrogen, and $R_2$ denotes hydrogen or an organic radical $R_2^A$ which can easily be split off under physiological conditions, are active against micro-organisms, such as Gram-positive bacteria, for example *Staphylococcus aureus*, and Gram-negative bacteria, for example *Escherichia coli*, and especially also against penicillin-resistant bacteria. Thus they are, for example, active against *Staphylococcus aureus* in dilutions of down to 0.0001 γ/ml. At the same time it should be noted that in contrast to known 7-acylamino-ceph-3-em-4-carboxylic acid compounds which are active against micro-organisms, the isomerisation of the double bond, which in the known compounds of the cephem series leads to the pharmacologically inactive ceph-2-em compounds, cannot take place in compounds of the formula I because of the double substitution in the 2-position. The new compounds can therefore be used accordingly, for example in the form of antibiotically active preparations.

Compounds of the formula I, wherein the radicals $R_1^a$ and $R_1^b$ represent hydrogen or $R_1^A$ and $R_1^b$ together represent a divalent amino protective group, and $R_2$ represents hydrogen, or wherein $R_1^a$ and $R_1^b$ have the abovementioned meanings, and $R_2$ represents an organic radical $R_2^A$ which together with the —C(=O)—O— grouping forms an esterified carboxyl group which can preferably be split easily, are valuable intermediate products, which can be converted into the abovementioned pharmacologically active compounds in a simple manner, for example as described below.

Particularly valuable compounds are those of the formula I, wherein $R_1^a$ denotes hydrogen or an acyl radical contained in a naturally occurring or biosynthetically, semisynthetically or totally-synthetically preparable, especially pharmacologically active, such as highly active, N-acyl derivative of a 6-amino-penicillanic acid compound or 7-amino-cephalosporanic acid compound, or denotes an easily removable acyl radical of a carbonic acid half-derivative, especially of a carbonic acid half-ester, $R_1^b$ represents hydrogen and $R_2$ represents hydrogen or an organic radical $R_2^A$, which together with the —C(=O)—O— grouping forms an esterified carboxyl group which can easily be split on treatment with water, with an acid agent, with a chemical reducing agent under neutral or weakly acid conditions, hydrolytically or hydrogenolytically, or under physiological conditions, or forms an esterified carboxyl group which can be converted into the above carboxyl group, and, for example, represents trimethylsilyl, tert.-butyl, diphenylmethyl, 2,2,2-trichloroethyl, 2-chloroethyl, 2-bromoethyl, 2-iodoethyl, phenacyl, 4-methoxybenzyl, 4-nitrobenzyl or acetonyl, and also salts of such compounds which have salt-forming groups.

Above all, $R_1^a$ in a compound of the formula I represents hydrogen or an acyl radical contained in naturally occurring of biosynthetically preparable N-acyl derivatives of 6-amino-penam-3-carboxylic acid compounds or 7-amino-ceph-3-em-4-carboxylic acid compounds, such as an optionally substituted phenylacetyl or phenyloxyacetyl radical, and also an optionally substituted lower alkanoyl or lower alkenoyl radical, for example 4-hydroxy-phenylacetyl, hexanoyl, octanoyl, 3-hexenoyl, 5-amino-5-carboxy-valeryl, n-butyl-mercaptoacetyl or allylmercaptoacetyl, and especially phenylacetyl or phenyloxyacetyl, an acyl radical occurring in highly active N-acyl derivatives of 6-amino-penam-3-carboxylic acid compounds or 7-amino-ceph-3-em-4-carboxylic acid compounds, such as formyl, 2-chloroethylcarbamoyl, cyanoacetyl or 2-thienylacetyl, especially phenylglycyl, wherein phenyl represents optionally hydroxyl-substituted and/or halogen substituted, for example chlorine substituted phenyl, for example phenyl, or 3- or 4-hydroxy- or 3,5-dichloro-4-hydroxy-phenyl, and wherein the amino group is optionally substituted and, for example, represents a sulphoamino group, optionally present in the salt form, or an amino group which is substituted by an optionally substituted carbamoyl group, such as an optionally substituted ureidocarbonyl group, for example ureidocarbonyl or $N^3$-trichloromethylureidocarbonyl, or by an optionally substituted guanidinocarbonyl group, for example guanidinocarbonyl, or by an acyl radical which can be split off, preferably easily, for example on treatment with an acid agent, such as trifluoroacetic acid, or with a chemical reducing agent, such as zinc in the presence of aqueous acetic acid, or an acyl radical which can be converted into such an acyl radical, preferably a suitable acyl radical of a carbonic acid half-ester, such as 2,2,2-trichloroethyloxycarbonyl, 2-chloroethoxycarbonyl, 2-bromoethoxycarbonyl, 2-iodoethoxycarbonyl, tert.-butoxycarbonyl, or phenacyloxycarbonyl, or of a carbonic acid half-amide, such as carbamoyl or N-methylcarbamoyl, also thienylglycyl, such as 2-thienylglycyl, (optionally with an amino group which is substituted, for example as indicated above), or 1-amino-cyclohexylcarbonyl (optionally with an amino group which is substituted, for example as indicated above) and also α-carboxyphenylacetyl or α-carboxy-2-thienylacetyl (optionally with a functionally modified carboxyl group, for example a carboxyl group present in the salt form, such as sodium salt form, or in the ester form, such as lower alkyl ester form) or α-sulfophenylacetyl (in which sulfo may be functionally modified, e.g. as the carboxyl group) or an acyl radical of a carbonic acid half-ester which can be split off easily, especially under acid conditions, for example on treatment with trifluoroacetic acid or reductively with zinc in the presence of aqueous acetic acid, such as tert.-butoxycarbonyl, phenylacylcarbonyl, 2,2,2-trichloroethoxycarbonyl or 2-iodoethoxycarbonyl, or 2-bromoethoxycarbonyl, which can be converted into the latter, and $R_1{}^b$ represents hydrogen and $R_2$ represents hydrogen or a radical $R_2{}^A$, which together with the —C(=O)—O— grouping forms an esterified carboxyl group which can be split easily hydrolytically and also hydrogenolytically on treatment with a chemical reducing agent under neutral or weakly acid conditions, with an acid agent or, preferably, under weakly basic conditions, and above all represents a methyl which is polysubstituted by optionally substituted hydrocarbon radicals, such as lower alkyl radicals, especially tert.-butyl or diphenylmethyl, and 2,2,2-trichloroethyl, 2-iodoethyl, and 2-chloroethyl or 2-bromoethyl which can easily be converted into 2-iodoethyl, or phenacyl, as well as 4-methoxybenzyl or 4-nitrobenzyl.

The invention above all relates to compounds of the formula

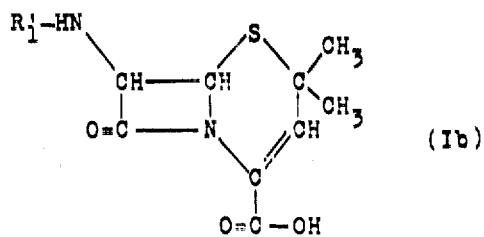

wherein $R_1{}'$ represents hydrogen or an acyl group of the formula

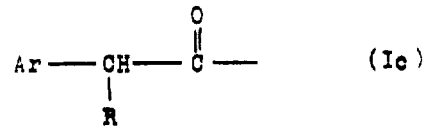

wherein Ar represents phenyl, 3- or 4-hydroxyphenyl, 3,5-dichloro-4-hydroxy-phenyl or 2-thienyl, and R represents amino, guanidinocarbonylamino, sulfonylamino, carboxy or sulfo, or salts of such compounds.

The new compounds of the present invention are obtained in a surprising manner if, in a 4β-(2-hydroxymethyl-2-propyl-thio)-1-(α-phosphoranylidene-esterified carboxymethyl)-3β-—N—$R_1{}^A$—N—$R_1{}^b$-amino-azetidin-2-one compound of the formula

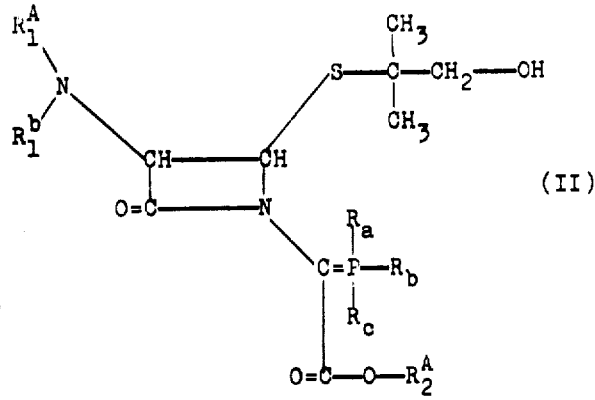

wherein each of the radicals $R_a$, $R_b$ and $R_c$ represents an optionally substituted hydrocarbon radical, the carbinol group is oxidised to a formyl group and, if desired, in a compound obtainable the group $R_1{}^A$ and/or the radical $R_1{}^b$ representing an acyl group Ac, or a divalent amino protective group formed by $R_1{}^A$ and $R_1{}^b$, is split off, and, if desired, the free amino group in a compound thus obtainable is protected and/or, if desired, a protected carboxyl group of the form. —C(=O)—O—$R_2{}^A$ in a compound obtained is converted into the free carboxyl group or into a different protected carboxyl group of the formula —C(=O)—O—$R_2{}^A$, and, if desired, a free carboxyl group in a compound obtained is converted into a protected carboxyl group of the formula —C(=O)—O—$R_2{}^A$, and/or, if desired, a resulting compound is converted into another compound of the formula I, and/or, if desired, a compound obtained having a salt-forming group is converted into a salt or a salt obtained is converted into the free compound or into another salt, and/or, if desired, an isomer mixture obtained is separated into the individual isomers.

In the starting material of the formula II, each of the groups $R_a$, $R_b$ and $R_c$ above all denote a lower alkyl radical which is optionally substituted by functional groups, for example by optionally etherified or esterified hydroxyl groups, such as lower alkoxy groups and/or halogen atoms, or represent a phenyl radical which is optionally substituted, for example by aliphatic hydrocarbon radicals, such as lower alkyl groups, and/or by functional groups, such as optionally etherified or esterified hydroxyl groups, such as lower alkoxy groups or halogen atoms, or nitro groups.

The oxidation of a compound of the formula II can, surprisingly, be effected by treatment with an oxidising organic sulphoxide compound in the presence of agents possessing dehydrating or water-absorbent properties. Oxidising sulphoxide compounds are, above all, aliphatic sulphoxide compounds, such as di-lower alkylsulphoxides, above all dimethylsulphoxide, or lower alkylenesulphoxides, for example tetramethylenesulphoxide. As agents possessing dehydrating or water-absorbing properties, there should above all be mentioned acid anhydrides, especially anhydrides of organic carboxylic acids, such as aliphatic or aromatic carboxylic acids, for example anhydrides of lower alkanecarboxylic acids, especially acetic anhydride, and also propionic anhydride, or benzoic anhydride, as well as anhydrides of inorganic acids, especially of phosphoric acids, such as phosphorus pentoxide. The above anhydrides, above all of organic carboxylic acids, for example acetic anhydride, are preferably used in an approximately 1:1 mixture with the sulphoxide oxidising agent. Further dehydrating or water-absorbing agents are carbodiimides, above all dicyclohexylcarbodiimide, as well as diisopropylcarbodiimide, or keteneimines, for example diphenyl-N-p-tolylketeneimine; these reagents are preferably used in the presence of acid catalysts, such as phosphoric acid or pyridinium trifluoroacetate or pyridinium phosphate. Sulphur trioxide can also be used as a dehydrating or water-absorbing agent, in which case it is customarily employed in the form of a complex, for example with pyridine.

The sulphoxide oxidising agent is usually employed in excess. Sulphoxide compounds which are liquid under the reaction conditions, especially dimethylsulphoxide, can, for example, simultaneously serve as the solvent; inert diluents, such as optionally halogenated hydrocarbons, preferably of aliphatic or aromatic character, for example benzene, or mixtures of solvents, can additionally be used as solvents.

The above oxidation reaction is carried out with cooling, if desired, but is in most cases carried out at room temperature or slightly elevated temperature, for example at temperatures of about −20°C to about 100°C.

In the reaction, a carbonyl compound obtainable as an intermediate product according to the process, and having the formula

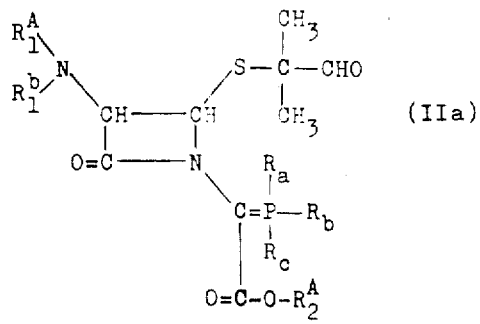

is cyclised directly under the reaction conditions, and without being isolated, to give the desired 7-aminoceph-3-em-4-carboxylic acid compound of the formula I.

In the process according to the invention it is possible, where necessary, to protect temporarily, in a manner which is in itself known, free functional groups in the starting substances which do not participate in the reaction, for example free hydroxyl, mercapto and amino groups, for examply by acylation, tritylation or silylation, and free carboxyl groups for example by esterification, including silylation, and to liberate these groups, if desired, in each case after the reaction has taken place, in a manner which is in itself known.

In a resulting compound, an amino protective group $R_1^A$ or $R_1^b$, especially an easily removable acyl group, can be removed in a manner which is in itself known, for example a tert.-butoxycarbonyl group by treatment with trifluoroacetic acid and a 2,2,2-trichloroethoxycarbonyl, 2-iodoethoxycarbonyl or phenacyloxycarbonyl group by treatment with a suitable metal or a metal compound, for example zinc, or with a chromium-II compound, such as chromium-II chloride or acetate, advantageously in the presence of a hydrogen-donating agent which together with the metal or the metal compound generates nascent hydrogen, preferably in the presence of aqueous acetic acid.

It is furthermore possible, in a resulting compound of the formula I, wherein a carboxyl group $—C(=O)—O—R_2$ preferably represents a carboxyl group which is protected, for example by esterification, including by silylation or stannylation, for example by reaction with a suitable organic halogenosilicon or halogeno-tin-IV compound, such as trimethylchlorosilane or tri-n-butyl-tin chloride, to remove a suitable acyl group $R_1^A$ or $R_1^b$, wherein free functional groups which may be present are optionally protected, by treatment with an imide-halide-forming agent, reaction of the resulting imide-halide with an alcohol and splitting of the imino-ether formed, and a carboxyl group protected, for example, by an organic silyl radical can already be liberated in the course of the reaction, for example during the treatment with an alcohol.

Imide-halide-forming agents, in which halogen is bonded to an electrophilic central atom, are above all acid halides, such as acid bromides and especially acid chlorides. These are, above all, acid halides of inorganic acids, above all of phosphorus-containing acids, such as phosphorus oxyhalides, phosphorus trihalides and especially phosphorus pentahalides, for example phosphorus oxychloride, phosphorus trichloride and above all phosphorus pentachloride, as well as pyrocatechyl-phosphorus trichloride, as well as acid halides, especially chlorides, of sulphur-containing acids or of carboxylic acids, such as thionyl chloride, phosgene or oxalyl chloride.

The reaction with one of the imide-halide-forming agents mentioned is preferably carried out in the presence of a suitable base, especially an organic base, above all a tertiary amine, for example a tertiary aliphatic monoamine or diamine, such as a tri-lower alkylamine, for example trimethylamine, triethylamine or ethyldiisopropylamine, or of an N,N,N',N'-tetra-lower alkyl-lower alkylenediamine, for example N,N,N',N'-tetramethyl-1,5-pentylene-diamine or N,N,N',N'-tetramethyl-1,6-hexylenediamine, a monocyclic or bicyclic monoamine or diamine, such as a N-substituted, for example N-lower alkylated, alkyleneamine, azaalkyleneamine, or oxaalkyleneamine, for example N- methyl-piperidine or N-methyl-morpholine, or 2,3,4,6,-7,8-hexahydro-pyrrolo[1,2-α] pyrimidine (diazabicyclononene; DBN), or a tertiary aromatic amine, such as a di-lower alkylaniline, for example N,Ndimethylaniline, or above all a tertiary heterocyclic, monocyclic or bicyclic, base, such as quinoline or isoquinoline, especially pyridine. In this reaction, approximately equimolar amounts of the imide-halide-forming agent and of the base can be used; the latter can, however, also be present in excess or in less than equivalent amounts, for example in about 0.2 fold to about 1 fold amount, or in up to about 10 fold excess, especially about 3–5 fold excess.

The reaction with the imide-halide-forming agent is preferably carried out with cooling, for example at temperatures of about −50°C to about +10°C, but the process can also be carried out at higher temperatures, that is to say, for example, up to about 75°C, if the stability of the starting substances and the stability of the products permit a higher temperature.

The imide-halide product, which is usually further processed without isolation, is reacted, in accordance with the process, with an alcohol, preferably in the presence of one of the abovementioned bases, to give the iminoether. Suitable alcohols are, for example, aliphatic as well as araliphatic alcohols, above all optionally substituted, such as halogenated, for example chlorinated lower alkanols, or lower alkanols possessing additional hydroxyl groups, for example ethanol, n-propanol, isopropanol or n-butanol, especially methanol, as well as 2,2,2-trichloroethanol, and also optionally substituted phenyl-lower alkanols, such as benzyl alcohol. Usually an excess, for example an up to 100 fold excess, of the alcohol is employed, and the process is preferably carried out with cooling, for example at temperatures of about −50°C to about 10°C.

The iminoether product can advantageously be split without isolation. The splitting of the iminoether can be achieved by treatment with a suitable hydroxy compound. For this, water, or an aqueous mixture of an organic solvent, such as an alcohol, especially a lower alkanol, for example methanol, is preferably used. The process is usually carried out in an acid medium, for example at a pH-value of about 1 to about 5, and this value can be adjusted, if necessary, by adding a basic agent, such as an aqueous alkali metal hydroxide, for example sodium hydroxide or potassium hydroxide, or an acid, for example a mineral acid or organic acid, such as hydrochloric acid, sulphuric acid, phosphoric acid, fluoboric acid, trifluoroacetic acid or p-toluenesulphonic acid.

The three-stage process, described above, for splitting off an acyl group is advantageously carried out without isolation of the imide-halide and iminoether intermediate products, usually in the presence of an organic solvent which is inert towards the reactants, such as an optionally halogenated hydrocarbon, for example methylene chloride, and/or in an inert gas atmosphere, such as a nitrogen atmosphere.

If the imide-halide intermediate product obtainable according to the above process, instead of being reacted with an alcohol, is reacted with a salt, such as an alkali metal salt, of a carboxylic acid, especially of a sterically hindered carboxylic acid, a N,N-diacylamino compound of the formula I is obtained, wherein $R_1{}^a$ and $R_1{}^b$ represent acyl groups.

In a compound of the formula I wherein both radicals $R_1{}^a$ and $R_1{}^b$ represent acyl groups, one of these groups, preferably the group which is less sterically hindered, can be removed selectively, for example by hydrolysis or aminolysis.

In a compound of the formula I, wherein $R_1{}^a$ and $R_1{}^b$ together with the nitrogen atom represent a phthalimido group, this group can be converted into the free amino group, for example by hydrazinolysis, that is to say on treating such a compound with hydrazine.

Certain acyl radicals of an acylamino grouping in compounds obtainable according to the invention, especially the 5-amino-5-carboxyvaleryl radical, can also be split off by treatment with a nitrosylating agent, such as nitrosyl chloride, with a carbocyclic arenediazonium salt, such as benzenediazonium chloride, or with an agent which releases positive halogen, such as a N-halogeno-amide or N-halogenoimide, for example N-bromosuccinimide, preferably in a suitable solvent or solvent mixture, such as formic acid together with a nitro-lower alkane or cyano-lower alkane, mixing the reaction product with a hydroxyl-containing agent, such as water or a lower alkanol, for example methanol, and, where necessary, working up the free amino compound according to methods which are in themselves known.

A formyl group $R_1{}^a$ can also be removed by treatment with an acid agent, for example p-toluenesulphonic acid or hydrochloric acid, a weakly basic agent, for example dilute ammonia, or a decarbonylating agent, for example tris-(triphenylphosphine)-rhodium chloride.

A triarylmethyl group, such as a trityl group $R_1{}^a$, can, for example, be removed by treatment with an acid agent, such as a mineral acid, for example hydrochloric acid.

In a compound of the formula I, wherein $R_1{}^a$ and $R_1{}^b$ represent hydrogen, the free amino group can be acylated according to acylation methods which are in themselves known, for example by treatment with carboxylic acids or reactive acid derivatives thereof, such as halides, for example fluorides or chlorides, or anhydrides (by which there are also to be understood the internal anhydrides of carboxylic acids, that is to say ketenes, or of carbamic acids or thiocarbamic acids, that is to say isocyanates or isothiocyanates, or mixed anhydrides, such as those which can, for example, be formed with chloroformic acid lower alkyl esters, such as chloroformic acid ethyl esters, or trichloroacetic acid chloride), or activated esters, or with substituted formimino derivatives, such as substituted N,N-dimethylchloroformimino derivatives, or a N-substituted N,N-diacylamine, such as a N,N-diacylated aniline, the reaction being carried out in the presence of suitable condensation agents if necessary, for example in the presence of carbodiimides, such as dicyclohexylcarbodiimide, when using acids, or in the presence of, for example, basic agents, such as triethylamine or pyridine, when using reactive acid derivatives. One may use in the acylation procedures salts, such as ammonium salts, of the compounds of the formula I, in which $R_2$ is hydrogen.

An acyl group can also be introduced by reacting a compound of the formula I, wherein $R_1{}^a$ and $R_1{}^b$ represent hydrogen, with an aldehyde, such as an aliphatic, aromatic or araliphatic aldehyde, acylating the resulting Schiff's base, for example according to the above-mentioned methods, and hydrolysing the acylated product, preferably in a neutral or weakly acid medium.

It is also possible to introduce an acyl group in stages. Thus it is, for example, possible to introduce a halogeno-lower alkanoyl group, for example bromoacetyl group, or, for example by treatment with a carbonic acid dihalide, such as phosgene, to introduce a halogenocarbonyl group, for example a chlorocarbonyl group, into a compound of the formula I having a free amino group, and to react a N-(halogeno-lower alkanoyl)-amino compound or N-(halogenocarbonyl)-amino compound, thus obtainable, with suitable exchange reagents, such as basic compounds, for example tetrazole, thio compounds, for example 2-mercapto-1-methylimidazole, or metal salts, for example sodium azide, or alcohols, such as lower alkanols, for example tert.-butanol, and thus to obtain substituted N-lower alkanoylamino or N-hydroxycarbonylamino compounds. It is furthermore possible, e.g. to react a compound of the formula I, wherein $R_1{}^a$ represents a glycyl group which is optionally substituted in the α-position, such as phenylglycyl, and $R_1{}^b$ represents hydrogen, with a lower alkanone, for example acetone, and thus to obtain compounds of the formula I, wherein $R_1{}^a$ and $R_1{}^b$ together represent a 1,1-di-lower alkyl-4-oxo-2-aza-1,4-butylene which is optionally substituted in the 3-position. In both reactants, free functional groups can be transiently protected, in a manner which is in itself known, during the acylation reaction, and can be liberated after the acylation by means of methods which are in themselves known.

The acylation can also be effected by replacing an already existing acyl group by a different, preferably sterically hindered, acyl group, for example according to the process described above, by preparing the imide-halide compound, treating this with a salt of an acid, and hydrolytically splitting off one of the acyl groups present in the product thus obtainable, usually the less sterically hindered acyl group.

In a compound of the formula I, wherein $R_1{}^a$ and $R_1{}^b$ represent hydrogen, the free amino group can also be protected by introducing a triarylmethyl group, for example by treatment with a reactive ester of a triarylmethanol, such as trityl chloride, preferably in the presence of a basic agent, such as pyridine.

An amino group can also be protected by introducing a silyl and stannyl group. Such groups are introduced in a manner which is in itself known, for example by treatment with a suitable silylating agent, such as a tri-lower alkylsilyl halide, for example trimethyl-silyl chloride, or an optionally N-mono-lower alkylated, N,N-di-lower alkylated, N-tri-lower alkylsilylated or N-lower alkyl-N-tri-lower alkylsilylated N-(tri-lower alkyl-silyl)-amine (see, for example, British Pat. No. 1,073,530) or with a suitable stannylating agent, such as a bis-(tri-lower alkyl-tin)-oxide, for example bis-(tri-n-butyl-tin)-oxide, a tri-lower alkyl-tin hydroxide, for example triethyl-tin hydroxide, a tri-lower alkyl-lower alkoxy-tin compound, tetra-lower alkoxy-tin compound or tetra-lower alkyl-tin compound, or a tri-lower alkyl-tin halide, for example tri-n-butyl-tin chloride (see, for example, Netherlands Published Specification 67/17107).

In a compound of the formula I, obtainable according to the process, which possesses a group of the formula $-C(=O)-O-R_2$, wherein $R_2$ represents hydrogen, the free carboxyl group can be esterified, in a manner which is in itself known, to give a protective carboxyl group, for example by treatment with a diazo compound, such as a diazo-lower alkane, for example diazomethane or diazoethane, or a phenyldiazo-lower alkane, for example phenyldiazomethane or diphenyldiazomethane, or by reaction with an alcohol which is suitable for esterification, in the presence of an esterifying agent, such as a carbodiimide, for example dicyclohexylcarbodiimide, as well as carbonyldiimidazole, or according to any other known and suitable esterification process, such as reaction of a salt of the acid with a reactive ester of an alcohol and a strong inorganic acid, as well as a strong organic sulphonic acid. Furthermore, it is possible to convert acid halides, such as acid chloride, manufactured, for example, by treatment with oxalyl chloride), activated esters (formed, for example, with N-hydroxy-nitrogen compounds) or mixed anhydrides (formed, for example, with halogenoformic acid lower alkyl esters, such as chloroformic acid ethyl ester, or with halogenoacetic acid halides, such as trichloroacetic acid chloride) into an esterified carboxyl group by reaction with alcohols, optionally in the presence of a base, such as pyridine.

Mixed anhydrides can be manufactured by reacting a compound of the formula I, wherein $R_2$ represents hydrogen, and preferably a salt thereof, especially an alkali metal salt or ammonium salt thereof, with a reactive derivative, such as a halide, for example the chloride, of an acid, for example a halogenoformic acid lower alkyl ester or a lower alkanecarboxylic acid chloride.

In a resulting compound, a grouping of the formula $-C(=O)-O-R_2{}^A$ can be converted into another group of this formula, for example 2-chloroethoxycarbonyl or 2-bromoethoxy-carbonyl of the formula $-C(=O)-O-R_2{}^a$ can be converted into 2-iodoethoxycarbonyl by treatment with an iodine salt, such as sodium iodide, in the presence of a suitable solvent, such as acetone.

Carboxyl groups protected by organic silyl groups or stannyl groups can be formed in a manner which is in itself known, for example by treating compounds of the formula I, wherein $R_2$ represents hydrogen, or salts, such as alkali metal salts, for example sodium salts, thereof, with a suitable silylating agent or stannylating agent, such as one of the abovementioned silylating agents or stannylating agents; see, for example, British Pat. No. 1,073,530 or Netherlands Published Specification No. 67/17107.

In a compound of the formula I, obtainable according to the invention, which has an esterified carboxyl group, with the latter representing, for example, an esterified carboxyl group of the formula $-C(=O)-O-R_2{}^A$ which can easily be converted into the free carboxyl group, the former group can be converted into the free carboxyl group in a manner which is in itself known, for example depending on the nature of the esterifying radical $R_2{}^A$; a grouping of the formula $-C(=O)-OR_2{}^a$ or $-C(=O)-OR_2{}^b$ can, for example, be converted by treatment with a chemical reducing agent, such as a metal, for example zinc, or a reducing metal salt, such as a chromium-II salt, for example chromium-II chloride, usually in the presence of a hydrogen-donating agent, which together with the metal can generate nascent hydrogen, such as an acid, above all acetic acid, or formic acid, or in the presence of an alcohol, to which water is preferably added; a grouping of the formula $-C(=O)-OR_2{}^c$ can, for example, be converted by irradiation, preferably with ultraviolet light, using shorter-wave ultraviolet light, for example below 290 mμ, if R₂ᶜ for example represents a benzyl radical which is optionally substituted in the 3-, 4- and-/or 5-position, for example by lower alkoxy groups and-/or nitro groups, or using longer-wave ultraviolet light, for example above 290 mμ, if R₂ᶜ denotes, for example a benzyl radical substituted in the 2-position by a nitro group; a grouping —C(=O)—OR₂ᵈ can, for example, be converted by treatment with a suitable acid agent, such as formic acid or trifluoroacetic acid, optionally with the addition of a nucleophilic compound, such as phenol or anisole; a grouping —C(=O)—OR₂ᵉ can be converted by hydrolysis, for example by treatment with a weakly acid, or especially with a weakly basic, aqueous agent, such as aqueous sodium bicarbonate or an aqueous potassium phosphate buffer of pH about 7 to about 9; and a grouping —C(=O)—OR₂ᶠ can be converted by hydrogenolysis, for example by treatment with hydrogen in the presence of a noble metal catalyst, for example a palladium catalyst.

A carboxyl group which is protected, for example by silylation or stannylation, can be liberated in the usual manner, for example by treatment with water or with an alcohol.

Resulting compounds can be converted into one another in a manner which is in itself known. Thus, for example, modified functional groups, such as acylated amino groups or esterified carboxyl groups, can be liberated according to methods which are in themselves known, for example those described above, or free functional groups, such as amino or carboxyl groups, can be functionally modified according to processes which are in themselves known, for example acylation or esterification.

Salts of compounds of the formula I can be manufactured in a manner which is in itself known. Thus it is possible to form salts of compounds of the formula I, wherein R₂ represents hydrogen, for example by treatment with metal compounds such as alkali metal salts of suitable carboxylic acids, for example the sodium salt of α-ethyl-caproic acid, or with ammonia or a suitable organic amine, for which purpose stoichiometric amounts, or only a slight excess of the salt-forming agent, are preferably used. Acid addition salts of compounds of the formula I having basic groupings are obtained in the usual manner, for example by treatment with an acid or with a suitable anion exchange reagent. Internal salts of compounds of the formula I, which contain a salt-forming amino group and a free carboxyl group, can, for example, be formed by neutralisation of salts, such as acid addition salts, to the isoelectric point, for example with weak bases, or by treatment with liquid ion exchangers.

Salts can be converted into the free compounds in the usual manner; metal salts and ammonium salts can, for example, be converted by treatment with suitable acids, and acid addition salts can, for example, be converted by treatment with a suitable basic agent.

Resulting mixtures of isomers can be separated into the individual isomers according to known methods, for example by fractional crystallisation, adsorption chromatography (column chromatography or thin layer chromatography) or other suitable separation processes. Resulting racemates can be separated into the antipodes in the usual manner, where appropriate after introduction of suitable salt-forming groupings, for example by forming a mixture of diastereoisomeric salts with optically active salt-forming agents, separating the mixture into the diastereoisomeric salts, and converting these separated salts into the free compounds, or by fractional crystallisation from optically active solvents.

The process also encompasses those embodiments according to which compounds arising as intermediate products are used as starting substances and the remaining process stages are carried out with these, or the process is stopped at any stage; furthermore, starting substances can be used in the form of derivatives or formed during the reaction.

Preferably, such starting substances are used, and the reaction conditions are so chosen, that the compounds initially mentioned as being particularly preferred are obtained.

The starting substances of the formula II used according to the process can, for example, be manufactured by converting the hydroxyl group in a compound of the formula

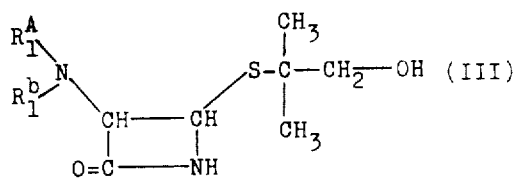

into a hydroxyl group esterified by the acyl radical of the formula —C(=O)—X, wherein X represents an etherified hydroxyl group, which together with the carbonyl grouping forms an esterified carboxyl group which can be split under mild conditions.

The compound of the formula

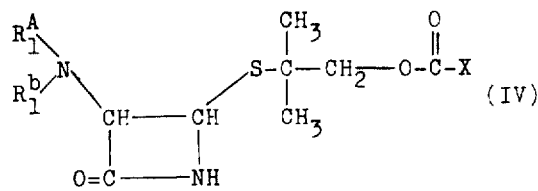

thus obtainable is reacted with a compound of the formula

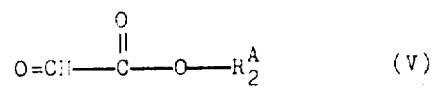

or a reactive derivative thereof, and in the addition compound of the formula

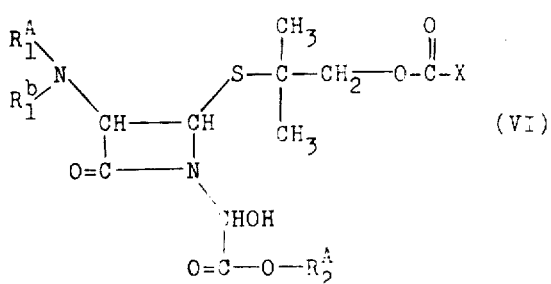

the secondary hydroxyl group is converted into a reactive esterified hydroxyl group. The reactive ester of the formula

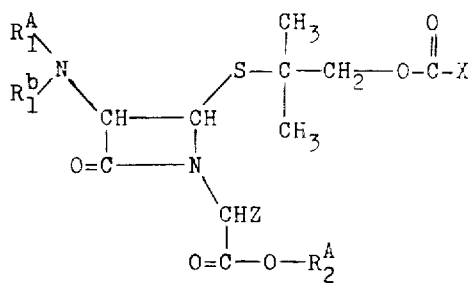

wherein Z represents a reactive esterified hydroxyl group, above all a halogen atom, especially a chlorine or bromine atom, or an organic sulphonyloxy group, for example a 4-methylphenylsulphonyloxy or methylsulphonyloxy group, is reacted with a phosphine compound of the formula

wherein each of the radicals $R_a$, $R_b$ and $R_c$ has the abovementioned meanings and represents an optionally substituted hydrocarbon radical, and this yields, if necessary after splitting off the elements of an acid of the formula H-Z (IXb) from a phosphonium salt compound of the formula

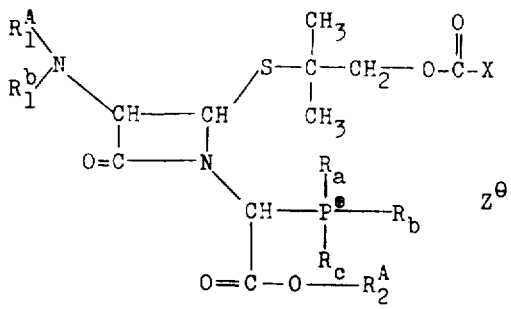

obtainable as an intermediate product, the phosphoranylidene compound of the formula

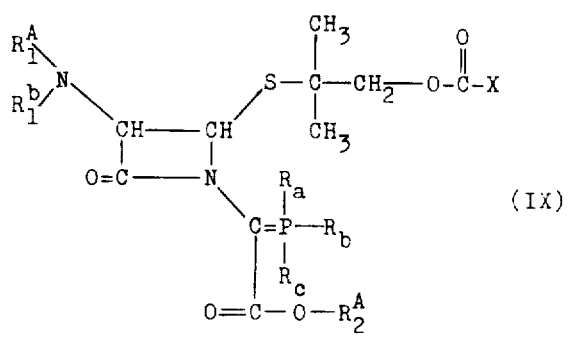

in which the esterified carboxyl grouping —C(=O)—X is split, thus producing the starting material of the formula II.

In a compound of the formula III, the hydroxyl group is converted, in a manner which is in itself known, by acylation, into the acyloxy group of the formula —O—C(=O)—X, especially into one of the groups of the formulae —O—C(=O)—O—$R_0{}^a$, —O—C(=O)—O—$R_{00hu\ b}$, —O—C(=O)—O—$R_0{}^c$, —O—C(=O)—O—$R_0{}^d$ and —O—C(=O)—O—$R_0{}^e$, wherein $R_0{}^a$, $R_0{}^b$, $R_0{}^c$, $R_0{}^d$ and $R_0{}^e$ have the meanings corresponding to the radicals $R_2{}^a$, $R_2{}^b$, $R_2{}^c$, $R_2{}^d$ or $R_2{}^e$, and above all represent 2,2,2-trichloroethyl, 2-bromoethyl, 2-iodoethyl, phenacyl, 4,5-dimethoxy-2-nitrobenzyl or tert.-butyl radicals. In this reaction, the usual acylating agents can be used, such as acids and especially suitable reactive derivatives of acids, if necessary in the presence of a condensation agent, an acid for example being used in the presence of a carbodiimide and an acid derivative in the presence of a basic agent, such as an organic tertiary base, for example triethylamine or pyridine. Reactive derivatives of acids are, for example, anhydrides including internal anhydrides such as ketenes, or isocyanates, or mixed anhydrides, which can in particular be prepared with halogenoformic acid esters, for example chloroformic acid ethyl ester, or halogenoacetic acid halides, for example trichloroacetic acid chloride, and also halides, above all chlorides, or reactive esters, such as esters of acids with alcohols or phenols containing electron-attracting groupings, or esters with N-hydroxy compounds, for example cyanomethanol, 4-nitrophenol or N-hydroxysuccinimide. At the same time, the acyl group can also be introduced in stages; thus, for example, a compound of the formula III can be treated with a carbonic acid dihalide, for example phosgene, and the compound of the formula IV thus obtainable, wherein X represents a halogen atom, for example a chlorine atom, can be converted into the desired compound of the formula IV by reaction with a suitable alcohol, for example 2,2,2-trichloroethanol, tert.-butanol or phenacyl alcohol. The acylation reaction can be carried out in the presence or absence of solvent or solvent mixtures, if necessary whilst cooling or warming, in a closed vessel under pressure and/or in an inert gas atmosphere, for example a nitrogen atmosphere, in stages if desired.

The addition of the glyoxylic acid ester compound of the formula V to the nitrogen atom of the lactam ring of a compound of the formula IV preferably takes place at elevated temperature, above all at about 50°C to about 150°c, and in particular in the absence of a condensation agent and/or without the formation of a salt. Instead of the free glyoxylic acid ester compound, a reactive oxo derivative thereof, above all a hydrate, can also be used, and the water produced when using the hydrate can, if necessary, be removed by distillation, for example azeotropically.

The process is preferably carried out in the presence of a suitable solvent, such as, for example dioxane or toluene, or solvent mixture, if desired or required in a closed vessel under pressure and/or in the atmosphere of an inert gas, such as nitrogen.

In a compound of the formula VI, the secondary hydroxyl group can be converted, in a manner which is in itself known, into a reactive hydroxyl group esterified by a strong acid, especially into a halogen atom or into an organic sulphonyloxy group. For this, for example, suitable halogenating agents, such as a thionyl halide, for example thionyl chloride, a phosphorus oxyhalide, especially phosphorus oxychloride, or a halogenophosphonium halide, such as triphenylphosphonium dibromide or triphenylphosphonium diiodide, or a suitable organic sulphonic acid halide, such as a sulphonic acid chloride, are used, and the reaction is preferably carried out in the presence of a basic agent, above all an organic basic agent, such as an aliphatic tertiary amine, for example triethylamine or diisopropylethylamine, or a heterocyclic base of the pyridine type, for example pyridine or collidine. Preferably, the process is carried out in the presence of a suitable solvent, for example dioxane or tetrahydrofurane, or of a solvent mixture, if necessary with cooling and/or in the atmosphere of an inert gas, such as nitrogen.

In a resulting compound of the formula VII, a reactive esterified hydroxyl group Z can be converted, in a manner which is in itself known, into another reactive esterified hydroxyl group. Thus it is for example possible to replace a chlorine atom by a bromine or iodine atom by treating the corresponding chlorine compound with a suitable bromine or iodine reagent, especially with an inorganic bromide or iodide salt, such as lithium bromide, preferably in the presence of a suitable solvent, such as ether, or to replace a suitable organic sulphonyloxy group, such as the methylsulphonyloxy group, by a halogen atom, for example a chlorine atom, in the presence of halogen ions such as chloride ions.

The reaction of a compound of the formula VII with the phosphine compound of the formula VIII, wherein each of the groups $R_a$, $R_b$ and $R_c$ above all represent phenyl, or a lower alkyl radical, especially the n-butyl radical, is preferably carried out in the presence of a suitable inert solvent, such as an aliphatic, cycloaliphatic or aromatic hydrocarbon, for example hexane, cyclohexane, benzene or toluene, or of an ether, for example dioxane, tetrahydrofurane or diethylene glycol-dimethyl ether, or of a solvent mixture. If necessary, the process is carried out with cooling or at elevated temperature and/or in the atmosphere of an inert gas, such as nitrogen.

A phosphonium salt compound of the formula IXa formed as an intermediate usually spontaneously loses the elements of the acid of the formula H—Z (IXb); if necessary, the phosphonium salt compound can be decomposed by treatment with a weak base, such as an organic base, for example diisopropylethylamine or pyridine, and be converted into the phosphoranylidene compound of the formula IX.

The splitting of the esterified carboxyl group of the formula —C(=O)—X into a compound of the formula IX can be carried out in various ways, depending on the nature of the group X. Thus a grouping —C(=O)—X, wherein X represents the group of the formula —O—$R_o{}^a$ and —O—$R_o{}^b$, can be split by treatment with a chemical reducing agent. This process is carried out under mild conditions, in most cases at room temperature or even with cooling.

Chemical reducing agents are, for example, reducing metals, as well as reducing metal compounds, for example metal alloys or metal amalgams, and also strongly reducing metal salts. The following are particularly suitable: zinc, zinc alloys, for example zinc-copper, or zinc amalgam, and also magnesium, which are preferably used in the presence of hydrogen-donating agents which can, together with the metals, metal alloys and metal amalgams, generate nascent hydrogen, zinc for example being used advantageously in the presence of acids, such as organic carboxylic acids, for example lower alkanecarboxylic acids, above all acetic acid, or acid agents, such as ammonium chloride or pyridine hydrochloride, preferably with the addition of water, or in the presence of alcohols, especially aqueous alcohols, such as lower alkanols, for example methanol, ethanol or isopropanol, which can, if desired, be used conjointly with an organic carboxylic acid, and alkali metal amalgams, such as sodium amalgam or potassium amalgam, or aluminium amalgam, in the presence of moist solvents, such as ethers or lower alkanols.

Strongly reducing metal salts are, above all, chromium-II salts, for example chromium-II chloride or chromium-II acetate, which are preferably used in the presence of aqueous media, containing organic solvents which are miscible with water, such as lower alkanols, carboxylic acids, such as lower alkanecarboxylic acid, or derivatives, such as optionally substituted, for example lower alkylated, amides thereof, or ethers, for example methanol, ethanol, acetic acid, dimethylformamide, tetrahydrofurane, dioxane, ethylene glycol-dimethyl ether or diethylene glycol-dimethyl ether.

In a compound of the formula IX, wherein X represents a radical of the formula —O—$R_o{}^c$, the group of the formula —C(=O)—X can be split by irradiation with light, preferably with ultraviolet light. For this, light of longer or shorter wavelengths is used, depending on the nature of the substituent $R_o{}^c$. Thus, for example, groups of the formula —C(=O)—O—$R_o{}^c$, wherein $R_o{}^c$ represents an arylmethyl radical, especially benzyl radical, which is substituted by a nitro group in the 2-position of the aryl radical and optionally possesses further substituents, such as lower alkoxy groups, for example methoxy groups, for example the 4,5-dimethoxy-2-nitro-benzyl radical, are split by irradiation with ultraviolet light with a wavelength range of over 290 m$\mu$, and those in which $R_o{}^c$ for example represents an arylmethyl radical, for example benzyl radical, which is optionally substituted in the 3-, 4- and/or 5-position, for example by lower alkoxy and/or nitro groups, are split by irradiation with ultraviolet light with a wavelength range of below 290 m$\mu$. In the former case, a high pressure mercury vapour lamp is used, preferably employing Pyrex glass as the filter, for example at a main wavelength range of about 315 m$\mu$, and in the latter case a low pressure mercury vapour lamp is used, for example at a main wavelength range of about 254 m$\mu$.

The irradiation reaction is carried out in the presence of a suitable polar or non-polar organic solvent or of a mixture; solvents are, for example, optionally halogenated hydrocarbons, such as optionally chlorinated lower alkanes, for example methylene chloride, or optionally chlorinated benzenes, for example benzene, and also alcohols, such as lower alkanols, for example methanol, or ketones, such as lower alkanones, for example acetone. Tthe reaction is preferably carried out at room temperature or, if desired, with cooling, usually in an inert gas atmosphere, for example a nitrogen atmosphere.

An esterified carboxyl grouping —C(=O)—O—$R_o{}^d$ can be split by treatment with an acid agent, especially with an acid, such as a strong organic carboxylic acid, for example an optionally substituted lower alkane carboxylic acid which preferably contains halogen atoms, such as trifluoroacetic acid, and also with formic acid or a strong organic sulphonic acid, for example p-toluenesulphonic acid. For this, an excess of an acid reagent which is liquid under the reaction conditions is usually employed as the diluent, and the process is carried out at room temperature or with cooling, for example to between about −20°C and about +10°C.

An esterified carboxyl grouping —C(=O)—OR$_o^e$ can be split hydrolytically, depending on the radical R$_o^e$ also under weakly acid or weakly basic conditions, for example at a pH value of about 7 to about 9, such as by treatment with an acid, with a suitable aqueous buffer solution, for example phosphate buffer solution, or with an alkali metal bicarbonate, such as sodium bicarbonate or potassium bicarbonate, in the presence of water and preferably of an organic solvent, such as methanol or acetone.

In a compound of the formula IX, the esterified carboxyl groups of the formulae —C(=O)—X and —C(=O)—O—R$_2^4$ preferably differ from one another in such a way that under the conditions of the splitting the esterified carboxyl group of the formula —C(=O)—X, the esterified carboxyl group of the formula —C(=O)—O—R$_2^4$ remains intact. If, for example, the esterified carboxyl group of the formula —C(=O)—X represents an esterified carboxyl group which can be split on treatment with a chemical reducing agent, such as zinc in the presence of aqueous acetic acid, for example represents a grouping of the formula —C(=O)—O—R$_o^a$ or —C(=O)—O—R$_o^b$, wherein R$_o^a$ preferably represents the 2,2,2-trichloroethyl or 2-iodoethyl radical, or a 2-chloroethyl or 2-bromoethyl radical which can easily be converted into the latter, and R$_o^b$ above all represents the phenacyl group, then the esterified carboxyl group of the formula —C(=O)—O—R$_2^4$ for example represents an esterified carboxyl group —C(=O)—O—R$_2^4$ which can be split on treatment with a suitable acid, such as trifluoroacetic acid, for example a grouping of the formula —C(=O)—O—R$_2^a$, wherein R$_2^a$ preferably represents the tert.-butyl group.

The intermediate products of the formula III are for example obtained if a penam-3-carboxylic acid compound Xa of formula

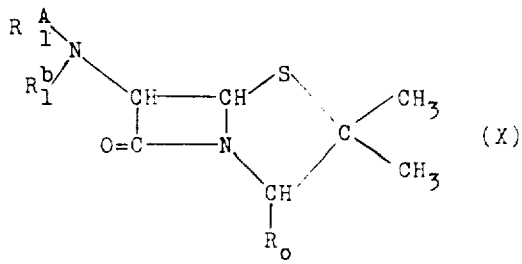

wherein R$_1^A$ above all represents an acyl group Ac and R$_1^b$ represents hydrogen, with free functional groups, for example hydroxyl, mercapto and especially amino and carboxyl groups in an acyl radical Ac optionally being protected, for example by acyl groups or in the form of ester groups, and R$_o$ represents a carboxyl group —C(=O)—OH (compound Xa), or a salt thereof, is converted into the corresponding acid azide compound of the formula X, wherein R$_o$ represents the azidocarbonyl radical —C(=O)—N$_3$ (compound Xb), this compound is converted, with elimination of nitrogen, to the corresponding isocyanate compound of the formula X, wherein R$_o$ denotes the isocyanate group —N=C=O (compound Xc), and this compound is simultaneously or subsequently treated with a compound of the formula H—X$_o$ (XI), wherein X$_o$ represents an etherified hydroxyl group, which together with a carbonyl grouping represents an esterified carboxyl group of the formula —C(=O)—X$_o$ which can split under neutral or weakly acid conditions.

A penam compound of the formula

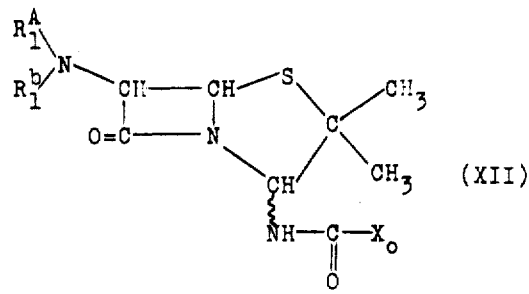

is thus obtained in which, if desired, an amino protective group R$_1^A$ can be replaced by hydrogen, for example according to the process described above, and an amino protective group can again be introduced into the free amino group, for example by acylation, and this penam compound is converted, on splitting the esterified carboxyl group of the formula —C(=O)—X$_o$ in the presence of water, into a penam compound of the formula

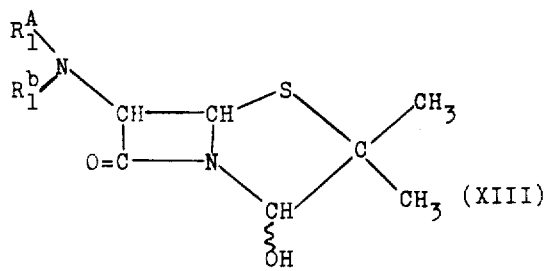

If a compound of the formula XIII is treated with a hydride reducing agent which is inert towards amide groupings, the desired compound of the formula III is obtained.

The conversion of an acid compound Xa or of a suitable salt, especially an ammonium salt, into the corresponding acid azide Xb can for example be carried out by conversion to a mixed anhydride (for example by treatment with a halogenoformic acid lower alkyl ester, such as chloroformic acid ethyl ester, or with trichloroacetic acid chloride in the presence of a basic agent, such as triethylamine or pyridine) and treatment of such an anhydride with an alkali metal azide, such as sodium azide, or an ammonium azide, for example benzyltrimethylammonium azide. The acid azide compound Xb thus obtainable can be converted into the desired isocyanate compound Xc in the absence or presence of a compound of the formula XI under the reaction conditions, for example on warming, and the compound Xc usually does not have to be isolated and can be directly converted, in the presence of a compound of the formula XI, into the desired compound of the formula XII.

In a compound of the formula XI, the group X$_o$ is preferably an etherified hydroxyl group which together with a carbonyl group forms an esterified carboxyl group which can easily be split under neutral or weakly acid conditions on treatment with a chemical reducing agent or on irradiation, preferably with ultraviolet light.

It represents, above all, one of the groups of the formulae —O—R₀ᵃ, —O—R₀ᵇ or —O—R₀ᶜ, wherein R₀ᵃ, R₀ᵇ and R₀ᶜ have the abovementioned meanings, above all the 2,2,2-trichloroethoxy group, the 2-iodoethoxy group or the 2-bromoethoxy group R₀ᵃ which can easily be converted into the former, the phenacyloxy group R₀ᵇ or the 4,5-dimethoxy-2-nitro-benzyloxy group R₀ᶜ.

The reaction with a compound of the formula XI, especially with an alcohol of the formula R₀ᵃ—OH, R₀ᵇ—OH or R₀ᶜ—OH, such as with a 2-halogeno-ethanol R₀ᵃ—OH, for example with 2,2,2-trichloroethanol or 2-bromoethanol, an arylcarbonylmethanol R₀ᵇ—OH, for example phenacyl alcohol, or an arylmethanol R₀ᶜ—OH, for example 4,5-dimethoxy-2-nitrobenzyl alcohol, is, if appropriate, carried out in an inert solvent, for example in an optionally halogenated aliphatic hydrocarbon, such as carbon tetrachloride, chloroform or methylene chloride, or in an optionally halogenated aromatic hydrocarbon, such as benzene, toluene or chlorobenzene, preferably with warming.

The splitting of an esterified carboxyl group of the formula —C(=O)—X₀ in a compound of the formula XII is for example carried out according to the processes described above which are applicable to splitting a group of the formula —C(=O)—X, the choice of the processes depending on the nature of the group X₀, and the process is carried out, or the mixture worked up, in the presence of at least one mol of water, and usually of an excess of water; that is to say, a group of the formula —C(=O)—O—R₀ᵃ or —C(=O)—O—R₀ᵇ can be split by treatment with a chemical reducing agent, such as zinc in the presence of aqueous acetic acid, and a group of the formula —C(=O)—O—R₀ᶜ can be split by irradiation, for example with ultraviolet light.

Hydride reducing agents which do not reduce an amide grouping are above all hydrides containing boron, such as, for example, diborane and especially alkali metal borohydrides or alkaline earth metal borohydrides, above all sodium borohydride. Complex organic aluminium hydrides, such as alkali metal tri-lower alkoxy-aluminium hydrides, for example lithium tri-tert.-butoxy-aluminium hydride, can also be used.

These reducing agents are preferably used in the presence of suitable solvents or mixtures thereof, alkali metal borohydrides for example being used in the presence of solvents possessing hydroxyl groupings or ether groupings, such as lower alkanols, for example methanol or ethanol as well as isopropanol, and also tetrahydrofurane or diethylene glycol-dimethyl ether, with cooling or warming, if necessary.

At any suitable stage in the manufacture of the starting substances, additional measures can be performed on intermediate products, by means of which they can be converted into other intermediate products of the same type; additional measures of this nature are, for example, carried out according to the processes described above which are employed in the conversion of the final substances. In a starting material of the formula II, for example, the chlorine or bromine atom in a 2-chloroethyl or 2-bromoethyl radical R₂ᵈ can be replaced by an iodine atom, such as by treatment with a suitable alkali metal iodide, such as sodium iodide, in the presence of a suitable solvent, such as acetone.

In the manufacture of the starting substances it is possible, if necessary, temporarily to protect, in a manner which is in itself known, free functional groups in the reactants which do not participate in the reactions, for example free hydroxyl, mercapto and amino groups, for example by acylation, tritylation or silylation, and free carboxyl groups, for example by esterification, including silylation, and to liberate these groups, if desired, in a manner which is in itself known, after the reaction has taken place.

The compounds of the formula I which exert pharmacological effects can, for example, be used in the form of pharmaceutical preparations, in which they are present mixed with a solid or liquid, pharmaceutical excipient, and which are suitable for enteral, parenteral or topical administration. Suitable excipients, which are inert towards the active substances, are, for example, water, gelatine, saccharides, such as lactose, glucose or sucrose, starches, such as corn starch, wheat starch or arrowroot, stearic acid or salts thereof, such as magnesium stearate or calcium stearate, talc, vegetable fats and oils, alginic acid, benzyl alcohols, glycols or other known excipients. The preparations can be in a solid form, for example as tablets, dragees, capsules or suppositories, or in a liquid form, for example as solutions, suspensions or emulsions. They can be sterilised and/or contain auxiliary substances, such as preservatives, stabilisers, wetting agents or emulsifiers, solubilising agents, salts for regulating the osmotic pressure and/or buffers. Furthermore they can contain other pharmacologically usable substances. The pharmaceutical preparations, which are also encompassed by the present invention, can be manufactured in a manner which is in itself known.

The invention is described in the examples which follow. Temperatures are given in degrees centigrade.

EXAMPLE 1:

A solution of 0.5205 g of α-[4β-(2-hydroxymethyl-2-propylmercapto)-2-oxo-3β-(N-phenylacetylamino)-1-azetidinyl]-α-triphenylphosphoranylidene-acetic acid tert.-butyl ester in 10 ml of absolute dimethylsulphoxide is mixed with 10 ml of acetic anhydride and the mixture is left to stand for 16 hours under a nitrogen atmosphere at room temperature, and is then warmed at 50°C for 2 hours and evaporated to dryness. The residue is purified by means of preparative thin layer chromatography (silica gel; 100 × 10 × 1.5 mm) plates). A 2:1 mixture of toluene and acetic acid ethyl ester is used for developing, and the desired 2,2-dimethyl-7-(N-phenylacetyl-amino)-ceph(3)em-4-carboxylic acid tert.-butyl ester of formula

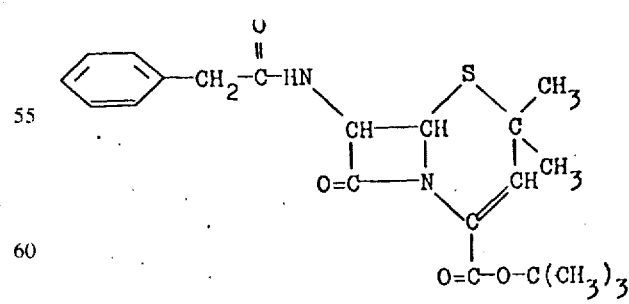

Rf~0.55–0.58 is obtained, which is formed by cyclisation from the α-[4β-(2-formyl-2-propylmercapto)-2-oxo-3β-(N-phenylacetylamino)-1-azetidinyl]-α-triphenylphosphoranylideneacetic acid tert.-butyl ester of formula

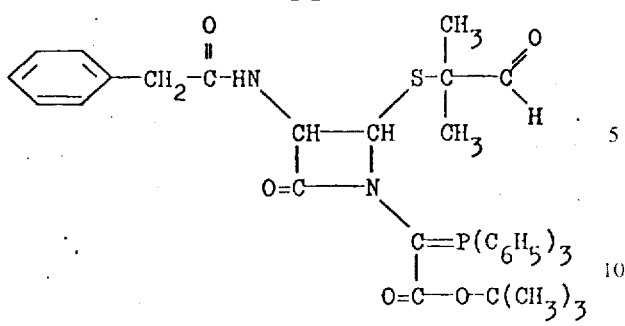

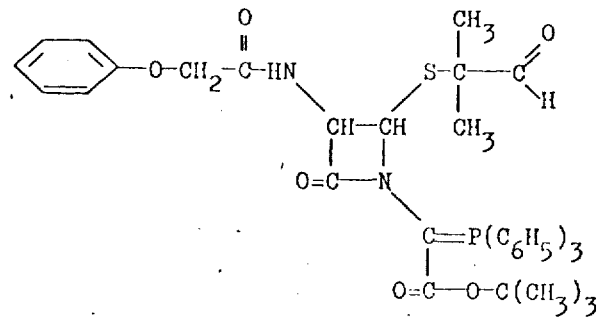

which is obtained as an intermediate and is not isolated; the desired ester crystallises on spraying with ethanol. The colourless crystals melt at 86°–90°C, resolidify and finally melt at 159°–162°C; $[\alpha]_D^{20} = +95° \pm 10°$ (c = 0.1 in chloroform); thin layer chromatogram (silica gel): Rf = 0.38 (system: hexane/acetic acid ethyl ester, 3:2); ultraviolet absorption spectrum (in ethanol): $\gamma_{max}$ 258 m$\mu$ ($\epsilon$ = 7100); infrared absorption spectrum (in methylene chloride): characteristic bands at 3.00$\mu$, 3.44$\mu$, 5.62$\mu$, 5.82$\mu$, 5.92$\mu$, 6.11$\mu$, 6.67$\mu$, 7.18$\mu$, 7.34$\mu$, 7.75$\mu$ and 8.66$\mu$.

EXAMPLE 2:

A solution of 0.0530 g of α-[4β-(2-hydroxymethyl-2-propylmercapto)-2-oxo-3β-(N-phenyloxacetylamino)-1-azetidinyl]-α-triphenylphosphoranylidene-acetic acid tert.-butyl ester in 1 ml of absolute dimethylsulphoxide and 1 ml of acetic anhydride is left to stand for 16 hours at room temperature, then warmed for 90 minutes at 50°C, and evaporated under a high vacuum. The residue is purified by means of preparative thin layer chromatography (20 × 20 × 1.5 mm silica gel plates; system toluene/acetic acid ethyl ester, 9:1). Elution with methanol of the strip which is active under ultraviolet light yields 2,2-dimethyl-7-(N-phenyloxy-acetyl-amino)-ceph(3)em-4-carboxylic acid tert.-butyl ester of formula

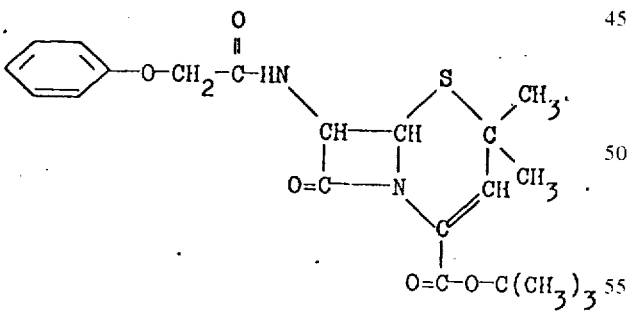

which is pure according to a thin layer chromatogram (Rf = 0.44; silica gel; system hexane/acetic acid ethyl ester, 3:2); ultraviolet absorption spectrum (in ethanol): $\gamma_{max}$ = 263 m$\mu$; infrared absorption spectrum (in methylene chloride): characteristic bands at 3.00$\mu$, 5.61$\mu$, 5.83$\mu$, 5.91$\mu$, 6.11$\mu$ and 6.26$\mu$; this substance is formed by cyclisation from α-[4β-(2-formyl-2-propylmercapto)-2-oxo-3β-(N-phenyloxyacetyl-amino)-1-azetidinyl]-α-triphenylphosphoranylidenea-cetic acid tert.-butyl ester of formula which is obtained as an intermediate and is not isolated.

In an analogous manner, 2,2-dimethyl-7-(N-tert.-butoxycarbonyl-amino)-ceph(3)em-4-carboxylic acid tert.-butyl ester is obtained via α-[4β-(2-formyl-2-propylmercapto)-2-oxo-3β-(N-tert.-butoxycarbonyl-amino)-1-azetidinyl]-α-triphenylphosphoranylidene-acetic acid tert.-butyl ester as the intermediate product which is not isolated.

EXAMPLE 3:

A solution of 0.58 g of 2,2-dimethyl-7-(N-phenylacetyl-amino)-ceph(3)em-4-carboxylic acid tert.-butyl ester in 10 ml of absolute trifluoracetic acid is left to stand for 1 hour at room temperature. The pale yellow solution is evaporated under reduced pressure and the residue is twice evaporated to dryness with a small amount of absolute toluene. The residue is chromatographed on 30 g of silica gel (5% of water; column). Impurities are eluted with methylene chloride, containing 2–4% of acetone; the chromatographically pure 2,2-dimethyl-7-(N-phenylacetylamino)-ceph(3)em-4-carboxylic acid of formula

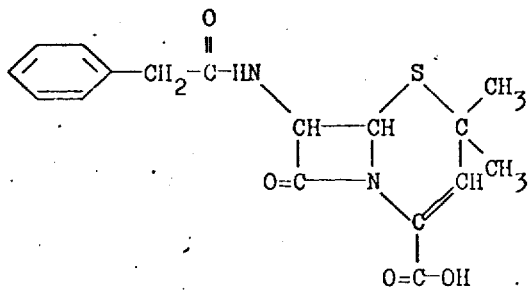

is eluted with 19:1 and 9:1 mixtures of methylene chloride and acetone, and slightly contaminated product is eluted with 4:1 and 1:1 mixtures of the same solvent mixture. The pure acid is obtained as a colourless, glassy material; ultraviolet absorption spectrum (in ethanol): $\gamma_{max}$ = 257 m$\mu$ ($\epsilon$ = 6450) and $\gamma_{min}$ = 232 m$\mu$ ($\epsilon$ = 4400); infrared absorption spectrum (in methylene chloride): characteristic bands at 2.90$\mu$, 5.57$\mu$, 5.72$\mu$3,82$\mu$, 5.90$\mu$, 6.11$\mu$, 6.64$\mu$, 7.08$\mu$, 7.31$\mu$, 8.20$\mu$ and 9.08$\mu$; thin layer chromatogram (silica gel): Rf = 0.41 (system n-butanol/ethanol/water, 40:10:50), Rf = 0.68 (system n-butanol/acetic acid/water, 44:12:44), Rf = 0.53 (system acetic acid ethyl ester/pyridine/acetic acid/water, 62:21:6:11), Rf = 0.62 (system n-butanol/pyridine/acetic acid/water, 38:24:8:30) and Rf = 0.61 (system n-butanol/acetic acid/water, 75:7.5:21).

If 2,2-dimethyl-7-(N-phenylacetyl-amino)-ceph(3)em-4-carboxylic acid is mixed with a slight excess of a 3-molar solution of the sodium salt of α-ethylcaproic acid in methanol, then, on dilution with acetone, the sodium salt of 2,2-dimethyl-7-(N-phenylacetyl-amino)-ceph(3)em-4-carboxylic acid, decomposing at 218°C (uncorrected) is obtained; ultraviolet absorption spectrum (in water): $\gamma_{max}$ 252 mμ (ε = 7300) and $\gamma_{min}$ = 232 mμ (ε = 5500); infrared absorption spectrum (in mineral oil): characteristic bands at 2.99μ, 5.65μ, 5.98μ, 6.22μ, 6.50μ, 6.67μ, 7.05μ, 7.29μ, 8.64μ, 9.03μ and 9.48μ.

EXAMPLE 4:

A solution of 0.0146 g of 2,2-dimethyl-7-(N-phenyloxyacetyl-amino)-ceph(3)em-4-carboxylic acid tert.-butyl ester in 1 ml of trifluoroacetic acid is left to stand for 1 hour at 23°C and then evaporated under reduced pressure. The oily residue is twice evaporated to dryness with a mixture of toluene and chloroform and is dried under reduced pressure. 2,2-Dimethyl-7-(N-phenyloxyacetyl-amino)-ceph(3)em-4-carboxylic acid of formula

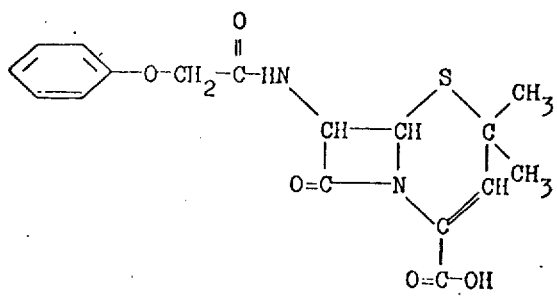

is thus obtained; infrared absorption spectrum (in methylene chloride): characteristic bands at 3.00μ, 3.34μ, 3.49μ, 5.62μ, 5.74μ, 5.92μ, 6.12μ, 6.27μ, 6.61μ and 6.72μ.

EXAMPLE 5:

A solution of 0.347 g of 2,2-dimethyl-7-(N-phenylacetyl-amino)-ceph(3)em-4-carboxylic acid (lyophilised from dioxane and dried at 30°C under a high vacuum) in 20 ml of absolute methylene chloride is mixed with 0.239 g of trimethylchlorosilane and 0.158 g of absolute pyridine and the mixture is stirred for 60 minutes at room temperature. The almost colourless solution is cooled to below −20°C, after which a solution of 1.07 g of absolute pyridine in 9.9 ml of absolute methylene chloride and 7.8 ml of an 8% strength solution of phosphorus pentachloride in absolute methylene chloride are successively added. The mixture is stirred for 60 minutes at −10°C to −12°C, in the course of which the solution turns pale yellow. After renewed cooling to about −20°C, 5 ml of absolute methanol are allowed to run in and the mixture is stirred for 25 minutes at −10°C and then for 35 minutes at room temperature. 5 ml of water are added, the pH-value of the reaction mixture is raised from 1.8 to 2.2 by dropwise addition of diethylamine, and the mixture is stirred for 20 minutes at room temperature. The pH-value is increased to 3.4 by renewed addition of triethylamine, and the turbid two-phase mixture is stirred for 90 minutes whilst cooling in an ice bath and is then filtered. The filter residue is washed with methanol, methylene chloride and diethyl ether and dried in a vacuum desiccator. 7-Amino-2,2-dimethyl-ceph(3)em-4-carboxylic acid of formula

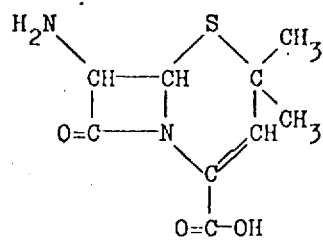

is thus obtained; ultraviolet absorption spectrum (in 0.1 N aqueous sodium hydrogen carbonate solution): $\gamma_{max}$ = 254 mμ (ε = 6350) and $\gamma_{min}$ = 234 mμ (ε = 4250); infrared absorption spectrum: characteristic bands at 3.10μ, 3.75μ, 5.51μ, 6.17μ, 6.52μ, 7.03μ, 7.30μ and 7.40μ (in mineral oil) and at 2.88μ, 3.10μ, 3.82μ, 5.52μ, 6.17μ, 6.50μ, 6.82μ, 7.04μ, 7.40μ, 8.13μ, 9.57μ, 12.10μ and 12.67μ (in potassium bromide); paper chromatogram (running distance 24 cm, system n-propanol/water, 7:3; detection with ninhydrin/collidine reagent): Rf = 0.44μ, thin layer chromatogram (cellulose; running distance 15.5 cm; system n-butanol/water/ethanol; detection with Reindel-Hoppe reagent): Rf = 0.37.

EXAMPLE 6:

A suspension of 0.080 g of 7-amino-2,2-dimethylceph(3)em-4-carboxylic acid in 2 ml of absolute methylene chloride is mixed with 0.0354 g of triethylamine in 0.36 ml of methylene chloride. The suspension is diluted with 5 ml of absolute tetrahydrofurane and stirred for 30 minutes, from time to time in an ultrasonics bath.

0.113 g of tert.-butoxycarbonyl-D-α-phenylglycine is dissolved in 5 ml of absolute methylene chloride, 0.0455 g of 4-methylmorpholine is added and the mixture is diluted with 10 ml of acetonitrile and cooled to −20°C. 0.0605 g of chloroformic acid isobutyl ester is added whilst stirring, after which the mixture is allowed to react for 30 minutes at −15°C. After renewed cooling to below −20°C, the milky suspension of the triethylammonium salt of 7-amino-2,2-dimethylceph(3)em-4-carboxylic acid is then added, and the reaction mixture is stirred for 30 minutes at −15°C, a further 30 minutes at 0°C, and finally for 2 hours at room temperature. Unreacted starting material is filtered off and washed with acetonitrile, methylene chloride and diethyl ether and dried. The filtrate is evaporated to dryness and the residue is taken up in acetic acid ethyl ester and water. This mixture is acidified to pH 2 by adding 5 molar aqueous phosphoric acid with good stirring and whilst cooling with ice. The organic phase is separated off and washed four times with a small amount of a saturated aqueous sodium chloride solution. The aqueous extracts are re-extracted with 2 portions of acetic acid ethyl ester and the combined organic extracts are dried over anhydrous magnesium sulphate and freed of the solvent under reduced pressure.

The yellowish foam obtained as a residue is chromatographed on 10 g of silica gel (column; addition of 5% of water). A material consisting mainly of unreacted tert.-butoxycarbonyl-D-α-phenylglycine is eluted with nine 40 ml portions of methylene chloride containing 1–4% of acetone, and a mixture of tert.- butoxycarbonyl-D-α-phenylglycine and 2,2-dimethyl-7-[N-(N-tert.-butoxycarbonyl-D-α-phenylglycyl)amino]-ceph(3)em-4-carboxylic acid of formula

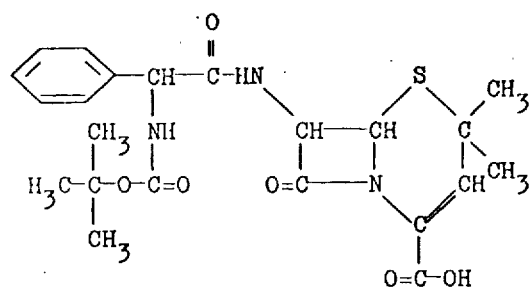

is obtained with three 40 ml portions of methylene chloride containing 5% of acetone.

The pure product is obtained using methylene chloride containing 7–50% of acetone; infrared absorption spectrum (in methylene chloride): characteristic bands at 2.94μ, 3.32μ, 5.60μ, 5.86μ, 5.92μ, 6.12μ, 6.62μ (shoulder), 6.69μ, 7.18μ, 7.31μ, 7.80μ, 8.21μ, 8.60μ, 9.10μ and 9.52μ; thin layer chromatogram (silica gel with addition of calcium sulphate; detection with iodine vapour or by spraying with trifluoracetic acid, followed by ninhydrin/collidine reagent): Rf = 0.67 (system n-butanol/acetic acid/water, 75:7.5:21), Rf = 0.71 (system n-butanol/acetic acid/water, 44:12:44), Rf = 0.58 (system acetic acid ethyl ester/pyridine/acetic acid/water, 62:21:6:11) and Rf = 0.68 (system acetic acid ethyl ester/n-butanol/pyridine/acetic acid/water, 42:21:21:6:10); ultraviolet absorption spectrum (in ethanol): $\gamma_{max}$=256 mμ ($\epsilon$ = 5,700).

EXAMPLE 7:

A solution of 0.0237 g of 2,2-dimethyl-7-[N-(N-tert.-butoxycarbonyl-D-α-phenylglycyl)-amino]-ceph(3)em-4-carboxylic acid (a single substance according to thin layer chromatography, and lyophilised from benzene) in 5 ml of pure formic acid is left to stand for 2 hours at room temperature. The clear, colourless solution is freeze-dried in a high vacuum and the lyophilised product is dried for 16 hours at 0.001 mm Hg and 35°C in order to remove the formic acid completely. 2,2-Dimethyl-7-[N-(D-α-phenylglycyl)-amino]-ceph(3)em-4-carboxylic acid in the zwitterion form, of formula

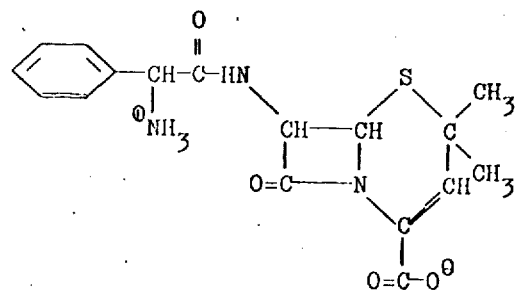

is obtained in the form of a fine white powder; thin layer chromatography (silica gel with addition of calcium sulphate; detection by means of ultraviolet light or ninhydrin/collidine reagent): Rf = 0.29 (system n-butanol/acetic acid/water, 67:10:23); Rf = 0.34 (system n-butanol/pyridine/acetic acid/water, 42:24:4:30), and Rf = 0.16 (system acetic acid ethyl ester/n-butanol/pyridine/acetic acid/water, 42:21:21:6:10); infrared absorption spectrum (in potassium bromide): characteristic bands at 2.90μ, 3.09μ, 3.22μ, 5.61μ, 5.89μ, 6.12μ, 6.52μ, 6.85μ, 7.10μ, 7.32μ, 7.79μ, 7.92μ, 8.15μ, 8.50μ 9.05μ, 9.54μ, 9.80μ, 13.64μ and 14.37μ.

EXAMPLE 8:

The 7-amino-2,2-dimethyl-ceph(3)em-4-carboxylic acid described in Example 5 can be N-acylated and converted into 7-(N-acyl-amino)-2,2-dimethyl-ceph(3)em-4-carboxylic acids of formula

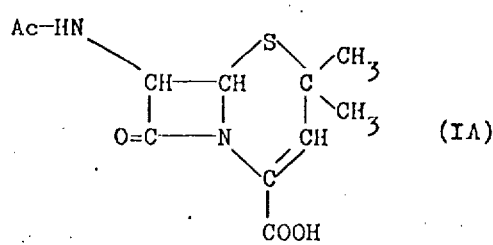

in accordance with the following general processes:

Variant A:

0.4 mmol of an acid [AcOH] is dissolved in 0.2 ml of absolute methylene chloride with the addition of 0.056 ml (0.4 mmol) of triethylamine [stock solution: 28.0 ml (200 mmols) of triethylamine, diluted to 100 ml with methylene chloride]. 0.0452 ml (0.4 mmols) of trichloracetic acid chloride in 0.2 ml of methylene chloride [stock solution 22.6 ml (200 mmols) of trichloracetic acid chloride diluted with methylene chloride to 100 ml] is added to the solution cooled to −15°C and the mixture is stirred for 30 minutes at −15°C. The solution containing the mixed anhydride [Ac—O—C(-=O)—CCl₃] is mixed with a finely disperse suspension, cooled to −15°C, of 0.046 g (0.2 mmol) of 7-amino-2,2-dimethyl-ceph(3)em-4-carboxylic acid and 0.056 ml (0.4 mmol) of triethylamine in 0.4 ml of methylene chloride, and the mixture is vibrated in an ultrasonics bath for 30 minutes at −15°C and then for 30 minutes at 20°C. The reaction solution, which is usually brown, is evaporated to dryness under reduced pressure, and the resulting residue is distributed between 2 ml of a 10% strength aqueous dipotassium hydrogen phosphate solution (pH 8.9) and 1 ml of acetic acid ethyl ester. The aqueous phase is adjusted to pH 2.6 with 20% strength aqueous phosphoric acid and thereafter exhaustively extracted with acetic acid ethyl ester. The acetic acid ethyl ester extract (6–10 ml) is washed with water, dried over sodium sulphate, and evaporated under reduced pressure. The residue is preparatively chromatographed in a suitable solvent system for 2–5 hours on a thin layer plate on silica gel. After drying the plate at room temperature in a nitrogen atmosphere, the silica gel zone which absorbs under ultraviolet light (254 mμ) is mechanically detached from the plate and extracted 3 times with 10 to 30 ml of ethanol or methanol. After evaporation of the extract under reduced pressure, 7-(N-acylamino)-2,2-dimethylceph(3)em-4-carboxylic acid is obtained as a beige or almost colourless residue.

If the thin layer plate displays more than one zone which absorbs in the ultraviolet light, the individual zones are separately worked up as described above. A sample of the material resulting from the various zones is tested in the plate diffusion test against *Staphylococcus aureus*. The material from the zone which is microbiologically the most active is subjected to a renewed preparative thin layer separation, whereby the product which is chromatographically a single substance can be isolated.

Variant B:

0.2 mmol of the sodium salt of an acid [AcONa] in 0.2 ml of absolute dimethylformamide is mixed with 0.2 mmol of trichloracetyl chloride as in Variant A, reacted with a solution of 0.2 mmol of 7-amino-2,2-dimethyl-ceph(3-em-4-carboxylic acid and 0.2 mmol of triethylamine in 0.2 ml of dimethylformamide, as in Variant A, and worked up.

Variant C:

A mixture of 0.25 mmol of an acid chloride [AcCl] in 0.2 ml of methylene chloride is added to a solution, cooled to −15°C, of 0.046 mg (0.2 mmol) of 7-amino-2,2-dimethyl-ceph(3)em-4-carboxylic acid and 0.070 ml (0.5 mmol) of triethylamine in 0.5 ml of methylene chloride, and reacted and worked up as in Variant A.

EXAMPLE 9:

If the process of Example 8, Variant B, the sodium salt of malonic acid methyl half-ester is used as the acylating starting material, 2,2-dimethyl-7-(N-methoxycarbonylacetyl-amino)-ceph(3)em-4-carboxylic acid of formula IA is obtained, wherein Ac denotes the radical of formula

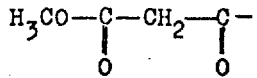

this compound showing an Rf value of 0.55 in a thin layer chromatogram (silica gel; system acetic acid ethyl ester/acetic acid, 9:1); ultraviolet absorption spectrum (in methanol): $\gamma_{max}$ at 258 m$\mu$; infrared absorption spectrum (in mineral oil): characteristic bands at 5.57$\mu$.

EXAMPLE 10:

If in the process of Example 8, Variant B, the sodium salt of malonic acid ethyl half-ester is used as the acylating starting material, 7-(N-ethoxycarbonylacetylamino)-2,2-dimethyl-ceph(3)em-4-carboxylic acid of formula IA, wherein Ac denotes the radical of formula

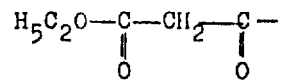

is obtained, this substance showing an Rf-value of 0.57 in a thin layer chromatogram (silica gel; system n-butanol/pyridine/acetic acid/water, 42:24:4:30); ultraviolet absorption spectrum (in methanol): $\gamma_{max}$ at 259 m$\mu$; infrared absorption spectrum (in mineral oil): characteristic band at 5.58 $\mu$.

EXAMPLE 11:

If in the process of Example 8, Variant C, bromacetic acid chloride is used as the acylating starting material, 7-(N-bromacetyl-amino)-2,2-dimethyl-ceph(3)cm-4-carboxylic acid of formula IA, wherein Ac denotes the radical of formula

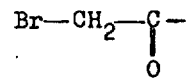

is obtained, this substance showing an Rf-value of 0.30–0.34 in a thin layer chromatogram (silica gel; system n-butanol/acetic acid/water, 75:7.5:21); ultraviolet absorption spectrum (0.1 molar aqueous sodium hydrogen carbonate solution): $\gamma_{max}$ at 258 m$\mu$.

EXAMPLE 12:

A mixture of 0.1394 g (0.4 mmol) of 7-(N-bromacetylamino)-2,2-dimethyl-ceph(3)em-4-carboxylic acid in 0.5 ml of methanol and 0.047 g (0.5 mmol) of 4-amino-pyridine is reacted in the presence of 0.048 g (0.5 mmol) of diisopropylethylamine at 40°C until the reaction is complete (checked by means of a thin layer chromatography). The mixture is evaporated and the residue is twice subjected to a preparative thin layer chromatography (silica gel). The 7-[N-(4-aminopyridinium-acetyl)-amino]-2,2-dimethyl-ceph(3-em-4-carboxylic acid of formula IA

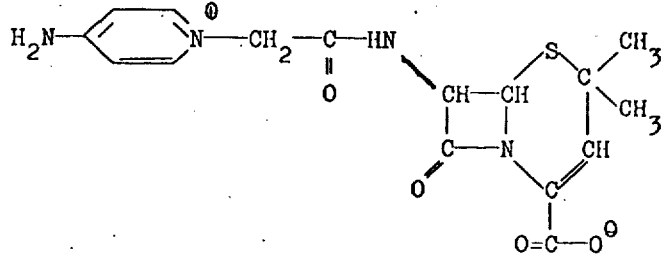

obtainable in this way shows an Rf-value of 0.25–0.4 in a thin layer chromatogram (silica gel; system n-butanol/pyridine/acetic acid/water, 42:24:4:30); ultraviolet absorption spectrum (in water): $\gamma_{max}$ at 266 m$\mu$; infrared absorption spectrum (in mineral oil): characteristic band at 5.63$\mu$.

EXAMPLE 13:

If in the process of Example 8, Variant A, malonic acid N-phenyl-half-amide is used as the acylating starting material, 2,2-dimethyl-7-[N-(N-phenylaminocarbonylacetyl)-amino]-ceph(3-)-em-4-carboxylic acid of formula IA, wherein Ac denotes the radical of formula

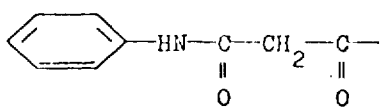

is obtained, this substance showing an Rf-value of 0.41 in a thin layer chromatogram (silica gel; system n-butanol/acetic acid/water, 67:10:23); ultraviolet absorption spectrum (in methanol): $\gamma_{max}$ at 241 m$\mu$ and 256 m$\mu$; infrared absorption spectrum (in mineral oil): characteristic band at 5.62 $\mu$.

EXAMPLE 14:

If in Example 8, Variant C, methoxyacetic acid chloride is used as the acylating starting material, 2,2-dimethyl-7-(N-methoxyacetyl-amino)-ceph(3-)em-4-carboxylic acid of formula IA, wherein Ac denotes the radical of formula

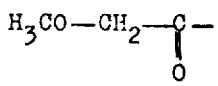

is obtained, this substance showing an Rf-value of 0.36 in a thin layer chromatogram (silica gel; system acetic acid ethyl ester/pyridine/acetic acid/water, 60:20:6:11); ultraviolet absorption spectrum (in dioxane): $\gamma_{max}$ = 257 m$\mu$; infrared absorption spectrum (in mineral oil): characteristic band at 5.59 $\mu$.

EXAMPLE 15:

If in Example 8, Variant C, phenyloxyacetyl chloride is used as the acylating starting material, 2,2-dimethyl-7-(N-phenoxyacetyl-amino)ceph(3)em-4-carboxylic acid of formula IA, wherein Ac denotes the radical of formula

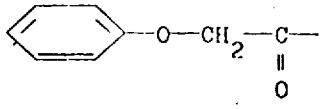

is obtained, this substance showing an Rf-value of 0.44 in a thin layer chromatogram (silica gel; system n-butanol/acetic acid/water, 75:7.5:21). According to the infrared absorption spectrum and thin layer chromatogram the compound is identical with the compound obtainable according to the process of Example 4.

EXAMPLE 16:

If in Example 8, Variant C, 4-methylphenylthioacetic acid chloride is used as the acylating starting material, 2,2-dimethyl-7-(N-4-methylphenylthioacetyl-amino)-ceph(3-)em-4-carboxylic acid of formula IA, wherein Ac denotes the radical of formula

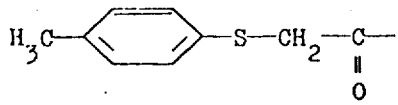

is obtained, this substance showing an Rf-value of 0.50 in a thin layer chromatogram (silica gel; system n-butanol/acetic acid/water, 67:10:23); ultraviolet absorption spectrum (in methanol): $\gamma_{max}$ at 249 m$\mu$; infrared absorption spectrum (in mineral oil): characteristic band at 5.62 $\mu$.

EXAMPLE 17:

A 10% strength suspension of 0.0697 g of 7-amino-2,2-dimethyl-ceph(3-em-4-carboxylic acid and 0.0202 g (0.2 mmol) of triethylamine in methylene chloride is mixed with a 10% strength solution of 0.0218 g (0.26 mmol) of diketene in methylene chloride and the mixture is vibrated for one hour at 22°C in an ultrasonics bath; after about 30 minutes a clear solution is obtained. The reaction mixture is worked up in accordance with the process of Example 8, Variant A, and 7-(N-acetoacetyl-amino)-2,2-dimethyl-ceph(3)-em-4-carboxylic acid of formula IA, wherein Ac denotes the radical of formula

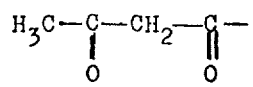

is thus obtained, this substance showing an Rf-value of 0.35 in a thin layer chromatogram (silica gel; system n-butanol/acetic acid/water, 75:7.5:21); ultraviolet absorption spectrum (in an 0.1 M aqueous sodium hydrogen carbonate solution): $\gamma_{max}$ at 238 m$\mu$ and 269 m$\mu$.

EXAMPLE 18:

If in the process of Example 8, Variant A, benzoylacetic acid is used as the acylating starting material, 7-(N-benzoylacetyl-amino)-2,2-dimethyl-ceph(3)em-4-carboxylic acid of formula IA, wherein Ac denotes the radical of formula

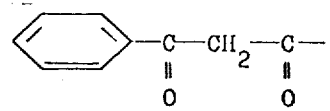

is obtained, this substance showing an Rf-value of 0.60 in a thin layer chromatogram (silica gel; system n-butanol/pyridine/acetic acid/water, 38:24:8:30); ultraviolet absorption spectrum (in 0.1 molar sodium hydrogen carbonate solution): $\gamma_{max}$=239 m$\mu$; infrared absorption spectrum (in mineral oil): characteristic band at 5.67 $\mu$.

EXAMPLE 19:

If in the process of Example 8, Variant A, cyanacetic acid is used as the acylating starting material, 7-(N-cyanacetyl-amino)-2,2-dimethyl-ceph(3)-em-4-carboxylic acid of formula IA, wherein Ac denotes the radical of formula

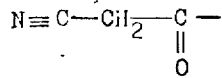

is obtained, this substance showing an Rf-value of 0.53 in a thinn layer chromatogram (silica gel; system n-butanol/pyridine/acetic acid/water, 38:24:8:30); ultraviolet absorption spectrum (in 0.1 molar aqueous sodium hydrogen carbonate solution): $\gamma_{max}$ at 258 m$\mu$; infrared absorption spectrum (in mineral oil): characteristic bands at 4.33$\mu$ and 5.60$\mu$.

EXAMPLE 20:

If in Example 8, Variant C, α-cyanopropionic acid chloride is used as the acylating starting material, 7-(N-α-cyanopropionyl-amino)-2,2-dimethyl-ceph(3)em-4-carboxylic acid of formula IA, wherein Ac denotes the radical of formula

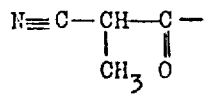

is obtained, this substance showing an Rf-value of 0.59 in a thin layer chromatogram (silica gel; system n-butanol/pyridine/acetic acid/water, 38:24:8:30); ultraviolet absorption spectrum (in 0.1 molar aqueous sodium hydrogen carbonate solution): $\gamma_{max}$ at 257 mμ; infrared absorption spectrum (in mineral oil): characteristic bands at 4.44μ and 5.64μ.

EXAMPLE 21:

If in the process of Example 8, Variant A, α-cyanophenylacetic acid is used as the acylating starting material, 7-(N-αcyanophenylacetylamino)-2,2-dimethyl-ceph(3)em-4-carboxylic acid of formula IA, wherein Ac denotes the radical of formula

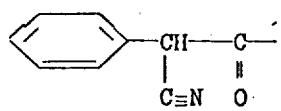

is obtained, this substance showing an Rf-value of 0.38 in a thin layer chromatogram (silica gel; system n-butanol/acetic acid/water, 75:7.5:21); ultraviolet absorption spectrum (in 0.1 molar aqueous sodium hydrogen carbonate solution): $\gamma_{max}$ at 260 mμ; infrared absorption spectrum (in mineral oil): characteristic bands at 4.40μ and 5.64μ.

EXAMPLE 22:

A 10% strength suspension of 0.0697 g (0.2 mmol) of 7-amino-2,2-dimethyl-ceph(3)em-4-carboxylic acid and 0.0429 g (0.3 mmol) of tri-n-butylamine in dimethylformamide is mixed with a 10% strength solution of 0.0422 g (0.4 mmol) of 2-chloroethylisocyanate in dimethylformamide, and the mixture is vibrated for 1 hour at 22°C in an ultrasonics bath. It is then worked up in accordance with the process described in Example 8, Variant A, and 7-[N-(2-chloroethylaminocarbonyl)-amino]-2,2-dimethyl-ceph(3)em-4-carboxylic acid of formula IA, wherein Ac denotes the radical of formula

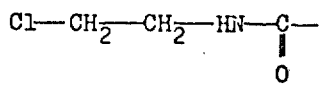

is thus obtained, this substance showing Rf-values of 0.53 (system n-butanol/acetic acid/water, 75:7.5:21) and of 0.70 (system n-butanol/pyridine/acetic acid/water, 38:24:8:30) in a thin layer chromatogram (silica gel); ultraviolet absorption spectrum (in 0.1 molar aqueous sodium hydrogen carbonate solution): $\gamma_{max}$ at 258 mμ.

EXAMPLE 23:

If in Example 8, Variant C, 3-chloropropionyl chloride is used as the acylating starting material, 7-(N-3-chloropropionyl-amino)-2,2-dimethyl-ceph(3)em-4-carboxylic acid of formula IA, wherein Ac denotes the radical of formula

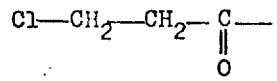

is obtained, this substance showing an Rf-value of 0.30 in a thin layer chromatogram (silica gel; system n-butanol/acetic acid/water, 75:7.5:21); ultraviolet absorption spectrum (in 0.1 molar aqueous sodium hydrogen carbonate solution): $\gamma_{max}$ at 256 mμ; infrared absorption spectrum (in mineral oil): characteristic band at 5.62μ.

EXAMPLE 24:

If in Example 8, Variant C, chloracetic acid chloride is used as the acylating starting material, 7-(N-chloracetyl-amino)-2,2-dimethyl-ceph(3)em-4-carboxylic acid of formula IA, wherein Ac denotes the radical of formula

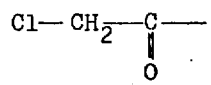

is obtained, this substance showing an Rf-value of 0.61 in a thin layer chromatogram (silica gel; system n-butanol/pyridine/acetic acid/water, 38:24:8:30); ultraviolet absorption spectrum (in 0.1 molar aqueous sodium hydrogen carbonate solution): $\gamma_{max}$ at 257 mμ; infrared absorption spectrum (in mineral oil): characteristic band at 5.62 μ.

EXAMPLE 25:

If in the process of Example 8, Variant A, dichloracetic acid is used as the acylating starting material, 7(N-dichloroacetyl-amino)-2,2-dimethyl-ceph(3)em-4-carboxylic acid of formula IA, wherein Ac denotes the radical of formula

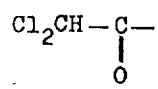

is obtained, this substance showing an Rf-value of 0.54 in a thin layer chromatogram (silica gel; system n-butanol/acetic acid/water, 75:7.5:21); ultraviolet absorption spectrum (in 0.1 molar aqueous sodium hydrogen carbonate solution): $\gamma_{max}$ at 257 mμ; infrared absorption spectrum (in mineral oil): characteristic band at 5.70μ.

EXAMPLE 26:

If in Example 8, Variant C, 2-propenecarboxylic acid chloride is used as the acylating starting material, 7-(N-butenoyl-amino)-2,2-dimethyl-ceph(3)em-4-carboxylic acid of formula IA, wherein Ac denotes the radical of formula

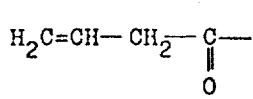

is obtained, this substance showing an Rf-value of 0.65 in a thin layer chromatogram (silica gel; system n-butanol/pyridine/acetic acid/water, 38:24:8:30).

EXAMPLE 27:

If in Example 8, Variant C, phenylacetic acid chloride is used as the acylating starting material, 2,2-dimethyl-7-(N-phenylacetyl-amino)-ceph(3)em-4-carboxylic acid of formula IA, wherein Ac denotes the radical of formula

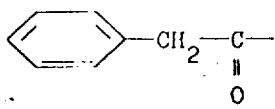

is obtained, with this substance showing an Rf-value of 0.62 in a thin layer chromatogram (silica gel; system n-butanol/pyridine/acetic acid/water, 38:24:8:30). According to a thin layer chromatogram, the compound is identical with the compound which can be manufactured according to the process described in Example 3.

EXAMPLE 28:

If in Example 8, Variant C, 2-thienylacetyl chloride is used as the acylating starting material, 2,2-dimethyl-7-(N-2-thienylacetyl-amino)-ceph(3)em-4-carboxylic acid of formula IA, wherein Ac denotes the radical of formula

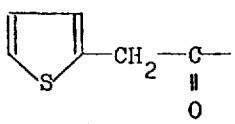

is obtained, with this substance showing an Rf-value of 0.59 in a thin layer chromatogram (silica gel; system n-butanol/pyridine/acetic acid/water, 38:24:8:30); ultraviolet absorption spectrum (in 0.1 molar aqueous sodium hydrogen carbonate solution): $\gamma_{max}$ at 235 m$\mu$; infrared absorption spectrum (in mineral oil): characteristic band at 5.64$\mu$.

EXAMPLE 29:

If in the process of Example 8, Variant A, methylthioacetic acid is used as the acylating starting material, 2,2-dimethyl-7-(N-methylthioacetyl-amino)-ceph(3)em-4-carboxylic acid of formula IA, wherein Ac denotes the radical of formula

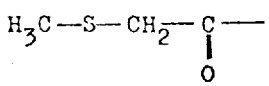

is obtained, with this substance showing an Rf-value of 0.60 in a thin layer chromatogram (silica gel; system n-butanol/pyridine/acetic acid/water, 38:24:8:30); ultraviolet absorption spectrum (in 0.1 molar aqueous sodium hydrogen carbonate solution): $\gamma_{max}$ at 256 m$\mu$; infrared absorption spectrum (in mineral oil): characteristic band at 5.7 $\mu$.

EXAMPLE 30:

If in Example 8, Variant C, bis-methoxycarbonyl-acetic acid chloride is used as the acylating starting material, 7-(N-bis-methoxycarbonylacetyl-amino)-2,2-dimethyl-ceph(3)em-4-carboxylic acid of formula IA, wherein Ac denotes the radical of formula

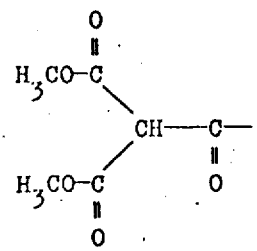

is obtained, with this substance showing an Rf-value of 0.57 in a thin layer chromatogram (silica gel; system n-butanol/pyridine/acetic acid/water, 38:24:8:30); ultraviolet absorption spectrum (in 0.1 molar aqueous sodium hydrogen carbonate solution): $\gamma_{max}$ at 249 m$\mu$; infrared absorption spectrum (in mineral oil): characteristic band at 5.57 $\mu$. The bis-methoxycarbonyl-acetic acid chloride used as the acylating agent is manufactured by reaction of the sodium salt of malonic acid dimethyl ester with phosgene in tetrahydrofurane at $-10°C$.

EXAMPLE 31:

In the process of Example 8, Variant A, phenylmalonic acid is used as the acylating starting material, 7-(N-$\alpha$-carboxy-phenylacetyl-amino)-2,2-dimethyl-ceph(3)em-4-carboxylic acid of formula IA, wherein Ac denotes the radical of formula

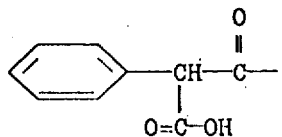

is obtained, this substance showing two zones in a thin layer chromatogram (silica gel; system n-butanol/acetic acid/water, 75:7.5:21): the more rapidly migrating zone, with Rf = 0.45, contains 2,2-dimethyl-7-(N-phenylacetylamino)-ceph(3)em-4-carboxylic acid and the more slowly migrating zone with Rf = 0.26 contains the desired 7-(N-$\alpha$-carboxy-phenylacetyl-amino)-2,2-dimethyl-ceph(3)em-4-carboxylic acid.

EXAMPLE 32:

If in the process of Example 8, Variant B, the sodium salt of DL-$\alpha$-(N-tert.-butoxycarbonyl-amino)-2-thienylacetic acid is used as the acylating material, 2,2-dimethyl-7-[N-$\alpha$-(N-tert.-butoxycarbonylamino)-2-thienylacetyl-amino]-ceph(3)em-4-carboxylic acid of formula IA, wherein Ac denotes the radical of formula

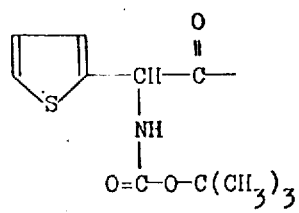

is obtained; this substance is purified by thin layer chromatography (silica gel) and shows an Rf-value of 0.54 in the system acetic acid ethyl ester/pyridine/acetic acid/water (62:21:6:11) and an Rf-value of 0.66 in the system acetic acid ethyl ester/n-butanol/pyridine/acetic acid/water (42:21:21:6:10). It can be converted in accordance with the process described in Example 7 into 7-[N-(α-amino-2-thienylacetyl)-amino]-2,2-dimethyl-ceph(3)em-4-carboxylic acid of formula A, wherein Ac denotes the radical of formula

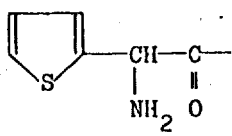

this is present as a zwitter-ion and shows an Rf-value of 0.47 in a thin layer chromatogram (silica gel) in the system acetic acid ethyl ester/methyl ethyl ketone/formic acid/water (50:30:10:10).

EXAMPLE 33:

A solution of the 7-(N-bromoacetyl-amino)-2,2-dimethyl-ceph(3)em-4-carboxylic acid obtainable according to the process described in Example 11 (about 0.15 mmol) in 0.3 ml of a solution of 17.3 ml of diisopropyl-ethylamine in 100 ml of methylene chloride is mixed with 0.0126 g (0.18 mmol) of tetrazole in 0.3 ml of dimethylformamide and allowed to react for 30 minutes at room temperature. The mixture is worked up according to the process described in Example 8 and 2,2-dimethyl-7-(N-1-tetrazolylacetylamino)-ceph(3)em-4-carboxylic acid of formula IA, wherein Ac denotes the radical of formula

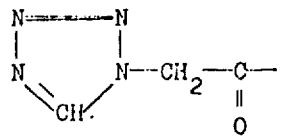

is thus obtained, this substance showing an Rf-value of 0.50 in a thin layer chromatogram (silica gel; system n-butanol/pyridine/acetic acid/water (42:24:4:30)); ultraviolet absorption spectrum (in methanol): $\gamma_{max}$ at 257 m$\mu$.

EXAMPLE 34:

If a solution of the 7-(N-bromoacetyl-amino)-2,2-dimethyl-ceph(3)em-4-carboxylic acid obtainable according to the process described in Example 11 (about 0.15 mmol) in 0.3 ml of a solution of 17.3 ml of diisopropyl-ethylamine in 100 ml of methylene chloride is reacted with 0.0205 g (0.18 mmol) of 2-mercapto-1-methyl-imidazole in 0.3 ml of dimethylformamide according to the process described in Example 33, the mixture being allowed to react for 7 hours at 20°C, 7-[N-(1-methyl-2-imidazolyl-thioacetyl)-amino]-2,2-dimethyl-ceph(3)em-4-carboxylic acid of formula IA, wherein Ac denotes the radical of formula

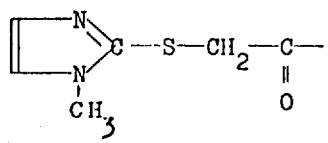

is obtained, this substance showing an Rf-value of 0.37 in a thin layer chromatogram (silica gel; system n-butanol/pyridine/acetic acid/water (42:24:4:30)); ultraviolet absorption spectrum (in methanol): $\gamma_{max}$ at 253 m$\mu$.

EXAMPLE 35:

If a solution of the 7-(N-bromacetyl-amino)-2,2-dimethyl-ceph(3)em-4-carboxylic acid obtainable according to the process described in Example 11 (about 0.15 mmol) in 0.3 ml of a solution of 17.3 ml of diisopropyl-ethylamine in 100 ml of methylene chloride is reacted with 0.0182 g (0.18 mmol) of 3-mercapto-1,2,4-triazole according to the process described in Example 33, the mixture being allowed to react for 7 hours at 20°C, 2,2-dimethyl-7-[N-(1,2,4-triazol-3-yl-thioacetyl)-amino]-ceph(3)em-4-carboxylic acid of formula IA, wherein Ac denotes the radical of formula

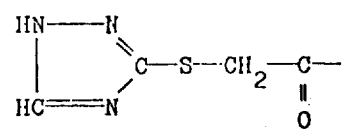

is obtained, this substance showing an Rf-value of 0.52 in a thin layer chromatogram (silica gel; system n-butanol/pyridine/acetic acid/water (42:24:4:30)); ultraviolet absorption spectrum (in methanol): $\gamma_{max}$ at 254 m$\mu$.

EXAMPLE 36:

If in Example 8, Variant C, dibromacetic acid chloride is used as the acylating starting material, 7-(N-dibromacetyl-amino)-2,2-dimethyl-ceph(3)em-4-carboxylic acid of formula IA, wherein Ac denotes the radical of formula

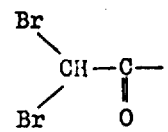

is obtained, this substance showing an Rf-value of 0.44 in a thin layer chromatogram (silica gel; system n-butanol/acetic acid/water (75:7.5:21)); ultraviolet absorption spectrum (in 0.1 molar aqueous sodium hydrogen carbonate solution): $\gamma_{max}$ at 253 m$\mu$; infrared absorption spectrum (in mineral oil): characteristic band at 5.61 $\mu$.

EXAMPLE 37:

A solution, manufactured at 30°C, of the 7-(N-bromacetyl-amino)-2,2-dimethyl-ceph(3)em-4-carboxylic acid manufactured according to the process described in Example 11 (about 0.15 mmol) in 10 ml of ethanol and 0.3 ml of water is mixed with a solution of 0.03 g of sodium azide in 0.5 ml of water. The reaction mixture is stirred for 15 hours at room temperature and with exclusion of light, and is worked up according to the process described in Example 8. 7-(N-Azidoacetyl-amino)-2,2-dimethyl-ceph(3)em-4-carboxylic acid of formula IA, wherein Ac denotes the radical of formula

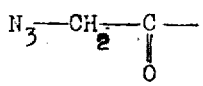

is thus obtained, this substance showing an Rf-value of 0.50 in a thin layer chromatogram (silica gel; system n-butanol/pyridine/acetic acid/water (42:24:4:30)); ultraviolet absorption spectrum (in methanol): $\gamma_{max}$ at 258 m$\mu$; infrared absorption spectrum (in mineral oil): characteristic band at 5.58 $\mu$.

EXAMPLE 38

A suspension of 0.05 g of 7-amino-2,2-dimethyl-ceph-3-em-4-carboxylic acid in 5 ml of dioxan and 5 ml of tetrahydrofurane is treated at 0° with 0.5 ml of triethylamine and 0.5 ml of bromoacetic acid chloride. The mixture is stirred for one hour at 0° and for 2 hours at room temperature, then evaporated under reduced pressure. The residue is extracted twice with 50 ml of ethyl acetate each time and twice with 25 ml of ethyl acetate each time. The combined organic extracts are washed with a saturated aqueous sodium chloride solution, dried over sodium sulfate and evaporated. The residue contains the 7-bromoacetylamino-2,2-dimethyl-ceph-3-em-4-carboxylic acid and is taken up in 10 ml of absolute methanol and treated with a solution of an excess of diazomethane in diethylether. The solution is allowed to stand at 0° for 5 minutes, evaporated and chromatographed on 10 g of silica gel.

The 7-bromo-acetylamino-2,2-dimethyl-ceph-3-em-4-carboxylic acid methyl ester of the formula

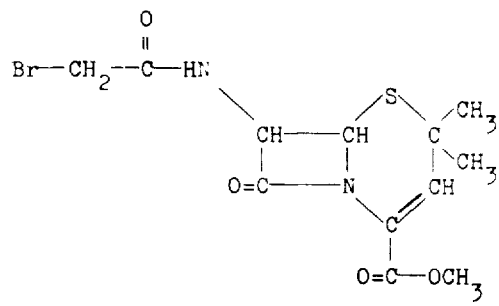

is eluted with a 4:1-mixture of toluene and ethyl acetate and recrystallized from a mixture of acetone and hexane, m.p. 126°–128°C; thinlayer chromatogram (silica gel): Rf = 0.3 to 0.4 (system: toluene/ethyl acetate 1:1); ultravioletabsorption spectrum (95% ethanol) : $\gamma_{max}$ = 257 m$\mu$ ($\epsilon$ = 7050); infrared absorption spectrum (in methylene/chloride): characteristic bands at 3.03$\mu$, 3.45$\mu$, 5.62$\mu$, 5.80$\mu$, 5.94$\mu$, 6.13$\mu$, 6.62$\mu$, 7.17$\mu$, 7.90$\mu$ and 8.27$\mu$.

EXAMPLE 39

A mixture of 0.135 g of the sodium salt of 2,2-dimethyl-7-phenylacetylamino-ceph-3-em-4-carboxylic acid and 0.25 g of 4-bromophenacyl bromide in 10 ml of dioxan and 0.5 ml of water is allowed to stand for 1 hour at 70°C and then concentrated. The residue is taken up in methylene chloride, the organic solution is washed with a saturated aqueous solution of sodium chloride, dried over sodium sulfate and evaporated. The residue purified by preparative thin layer chromatography (silica gel; thickness of the layer 1.5 mm, and lenght 1 m), the chromatogram being developed with a 1:1-mixture of toluene and ethylacetate. The zone which fluoresces under ultraviolet light and shows an Rf-value of 0.5 is scratched off and extracted with acetone. The organic extract is evaporated and the residue is crystallized from a mixture of methylene chloride and hexane. The resulting 4-bromophenacyl ester of 2,2-dimethyl-7-phenylacetylamino-ceph-3-em-4-carboxylic acid of the formula

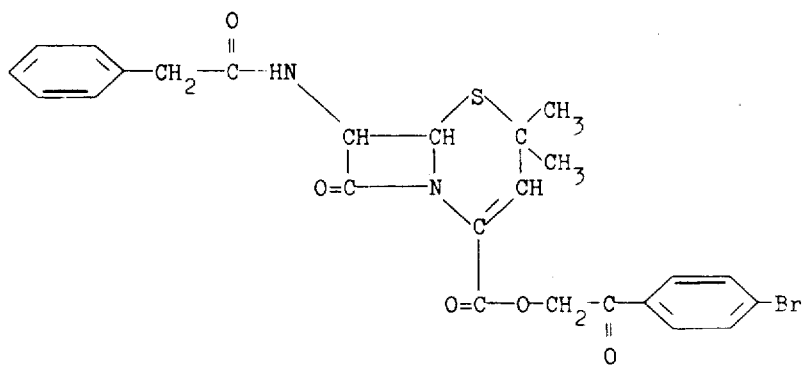

melts at 134°–135°C; ultraviolet absorption spectrum (95% ethanol): $\gamma_{max}$ = 258 m$\mu$ ($\epsilon$ = 27400); infrared absorption spectrum (in methylene chloride): characteristic bands at 3.01$\mu$, 3.35$\mu$, 3.44$\mu$, 5.58$\mu$, 5.75$\mu$, 5.85$\mu$, 6.12$\mu$, 6.30$\mu$, 6.67$\mu$, 7.16$\mu$, 8.23$\mu$ and 8.55$\mu$.

The starting substances used in the preceding examples can be manufactured as follows:

EXAMPLE 40:

15 ml of a sulphonic acid-type of ion exchanger (H$^+$-form) are converted into the triethylammonium salt from by treatment with a solution of 5 ml of triethylamine in 100 ml of water, and the column is washed with 300 ml of water until neutral, treated with a solution of 2 g of the sodium salt of penicillin-G in 10 ml of water, and thereafter eluted with water. A volume of 45 ml is withdrawn and lyophilised at a pressure of 0.01 mm Hg. The crude triethylammonium salt of penicillin-G thus obtained is dissolved in methylene chloride, and the solution is dried over sodium sulphate, filtered and evaporated.

A solution of the penicillin-G-triethylammonium salt thus obtainable, in a mixture of 40 ml of methylene chloride and 40 ml of tetrahydrofurane, is cooled to −10°C and 2.9 ml of a 10 ml solution of 2 ml of chloroformic acid ethyl ester in tetrahydrofurane is slowly added whilst stirring. The mixture is stirred for 90 minutes at −5°C to 0°C, a solution of 0.395 g of sodium azide in 4 ml of water is then added, and the mixture is stirred for 30 minutes at −5°C to 0°C. It is diluted with 100 ml of ice water and extracted 3 times with 75 ml portions of methylene chloride; the organic extracts are washed with water, dried and evaporated at room temperature under reduced pressure. The amorphous penicillin-G-azide is thus obtained, infrared absorption spectrum (in methylene chloride): characteristic bands at 3.05μ, 4.71μ, 5.62μ, 5.80μ, 5.94μ, 6.69μ and 8.50μ.

A solution of 1.72 g of the penicillin-G-azide in 30 ml of benzene is mixed with 1.5 ml of 2,2,2trichlorethanol and stirred for 25 hours at 70°C. During the first 15 minutes, a uniform evolution of nitrogen is observed and after some hours the product separates out from the solution. The mixture is diluted with 60 ml of hexane whilst stirring, cooled and filtered after 15 minutes. The filter residue is washed with a 2:1 mixture of benzene and hexane and with cold ether. Pure 2,2-dimethyl-6-(N-phenylacetyl-amino)-3-(N-2,2,2-trichlorethoxycarbonylamino)-penam is thus obtained, melting at 223°–223.5°C; $[\alpha]_D^{20} = +172°$ (c = 1.018 in ethanol); infrared absorption spectrum (in methylene chloride): characteristic bands at 3.04μ, 5.61μ, 5.77μ, 6.97μ, 6.70μ, 8.30μ, 9.17μ, 9.62μ and 11.85μ.

The product can also be obtained by warming 0.03 g of the penicillin-G-azide in 2 ml of benzene to 70°C for 20 minutes, obtaining the 3-isocyanato-2,2-dimethyl-6-(N-phenyl-acetyl-amino)-penam; infrared absorption spectrum (in methylene chloride): characteristic bands at 3.06μ, 4.48μ, 5.62μ, 5.96μ and 6.70μ; by evaporation of the reaction mixture under reduced pressure, and converting this, according to the process indicated in Example 4, by reaction with 2,2,2-trichlorethanol into the desired 2,2-dimethyl-6-(N-phenylacetylamino)-3-(N-2,2,2-trichlorethoxycarbonylamino)-penam.

A solution of 2.49 g of 2,2-dimethyl-6-(N-phenylacetyl-amino)-3-(N-2,2,2-trichlorethoxycarbonyl-amino)-penam in 50 ml of dimethylformamide, 25 ml of acetic acid and 5 ml of water is prepared at room temperature, then cooled to 0°C, and mixed over the course of 10 minutes, whilst stirring, with a total of 25 g of zinc dust added in portions. The mixture is stirred for 20 minutes at 0°C and then filtered into a receiver containing 500 ml of a saturated aqueous sodium chloride solution, and the filter residue is eluted with 25 ml of acetic acid. The filtrate is extracted three times with 300 ml portions of benzene; the organic extracts are washed with water, dilute aqueous sodium hydrogen carbonate solution and water, combined, dried and evaporated under reduced pressure. The residue is chromatographed on 45 g of acid-washed silica gel. Fractions of 100 ml each are withdrawn, elution being carried out with 300 ml of benzene, 300 ml of a 9:1 mixture, 500 ml of a 4:1 mixture, 600 ml of a 2:1 mixture and 200 ml of a 1:1 mixture of benzene and acetic acid ethyl ester and with 100 ml of acetic acid ethyl ester. Fractions 8 and 9 contain crystalline starting material, whilst the 3-hydroxy-2,2-dimethyl-6-(N-phenylacetyl-amino)-penam is obtained as a colourless oil from fractions 11–15; infrared absorption spectrum (in methylene chloride): characteristic bands at 2.90μ, 3.05μ, 5.64μ, 5.99μ, 6.70μ and 9.28μ.

A solution of 0.3 g of 3-hydroxy-2,2-dimethyl-6-(N-phenylacetyl-amino)-penam in 8 ml of tetrahydrofurane is treated at 0°C with 0.5 ml of a solution of 0.38 g of sodium borohydride in 5 ml of water. The reaction mixture is stirred for 20 minutes at 0°C, then acidified with 20 drops of acetic acid, and diluted with 50 ml of methylene chloride. The organic solution is washed with a saturated aqueous sodium chloride solution, dried and evaporated. The residue, after crystallisation from benzene, yields 4β-(2-hydroxymethyl-2-propylmercapto)-3β-(N-phenylacetyl-amino)-azetidin-2-one melting at 129°–129.5°C; $[\alpha]_D^{20} = 1° \pm 1°$ (c = 0.984 in chloroform); ultraviolet absorption spectrum (in ethanol): $\gamma_{max}$ = 252 mμ (ε = 170), 258 mμ (ε = 200) and 265 mμ (ε = 150); infrared absorption spectrum: characteristic bands in methylene chloride at 2.75μ, 2.92μ, 5.61μ, 5.97μ, 6.23μ, 6.62μ, 6.68μ (shoulder) and 9.48μ, and in mineral oil at 3.12μ, 3.18μ (shoulder), 3.23μ, 5.62μ, 5.75μ, 6.08μ, 6.23μ, 6.42μ, 8.02μ and 9.45μ; thin layer chromatogram (silica gel): Rf = 0.10 (chloroform/acetone, 4:1), Rf = 0.33 (chloroform/methanol 19:1) and Rf = 0.63 (chloroform/methanol, 9:1).

A solution of 1.55 g of 4β-(2-hydroxymethyl-2-propylmercapto)-3β-(N-phenylacetylamino)-azetidin-2-one and 1.42 g of chloroformic acid 2,2,2-trichlorethyl ester in 20 ml of absolute tetrahydrofurane is cooled to 0°C and mixed with a solution of 0.81 ml of absolute pyridine (0.79 g) in 10 ml of absolute tetrahydrofurane over the course of 3 minutes, whilst stirring. After completion of the addition, the temperature is allowed to rise to about 20°C and stirring is continued for 2 hours. The reaction mixture is diluted with 150 ml of methylene chloride and 40 ml of water, shaken, and the phases separated. The aqueous phase is twice washed with 50 ml portions of methylene chloride and the combined organic phases are twice washed with 30 ml portions of water, dried over magnesium sulphate and freed of the solvent under reduced pressure. The residue is chromatographed on a column of 165 g of silica gel. Bis-(2,2,2-trichlorethyl)-carbonate and a little 2,2,2-trichlorethanol are eluted with a 19:1 mixture of methylene chloride and acetic acid methyl ester; 3β-(N-phenylacetylamino)-4β-[2-(2,2,2-trichlorethoxyloxy-carbonyloxymethyl)-2-propylmercapto]-azetidin-2-one is eluted as an amorphous product, which is pure according to thin layer chromatography, with a 9:1 mixture of methylene chloride and acetic acid methyl ester, and is lyophilised from benzene. The lyophilised product is dried for 20 hours at room temperature in a high vacuum; $[\alpha]_D^{20}$ = −3° ± 1° (c = 1.097 in chloroform); thin layer chromatogram (silica gel): Rf = 0.24 (toluene/acetic acid ethyl ester, 1:1) and Rf = 0.78 (chloroform/acetone, 2:1); infrared absorption spectrum (in methylene chloride): characteristic bands at 2.91μ, 5.61μ, 5.64μ (shoulder), 5.92μ, 6.62μ, 7.22μ, 8.08μ, 10.00μ and 12.25μ.

A solution of 3.2 g of glyoxylic acid tert.-butyl ester hydrate in 80 ml of toluene is concentrated to half its volume in order to remove water and after cooling is mixed with 0.880 g of 3β-(N-phenylacetylamino)-4β-(2-[2,2,2-trichlorethoxy-carbonyloxymethyl)-2-propylmercapto]-azetidin-2-one. The reaction mixture is then warmed for 4½ hours at 90°C and after cooling is absorbed on a column of 120 g of silica gel. α-Hydroxy-α-{2-oxo-3β-(N-phenylacetylamino)-4β-[2-(2,2,2-trichlorethoxy-carbonyloxymethyl)-2-propylmercapto]-1-azetidinyl} -acetic acid tert.-butyl ester is eluted with a 3:1 mixture of toluene and acetic acid ethyl ester; this substance shows an Rf-value of 0.36 (system: benzene/acetic acid ethyl ester, 1:1) in a thin layer chromatogram (silica gel) and represents a uniform product, which is used without further purification.

A solution of 0.932 g of α-hydroxy-α-{2-oxo-3β-(N-phenylacetylamino)-4β-[2-(2,2,2-trichlorethoxy-carbonyloxymethyl)-2-propylmercapto]-1-azetidinyl}-acetic acid tert.-butyl ester in 18 ml of a 1:1 mixture of dioxane and tetrahydrofurane, cooled to −10°C, is mixed with 0.366 ml of pyridine and then with a solution of 0.328 ml of thionyl chloride in 10 ml of a 1:1 mixture of dioxane and tetrahydrofurane. The reaction mixture is stirred for 1 hour at 0°C and for a further hour at room temperature; the resulting precipitate is filtered off and the filtrate is evaporated in a rotary evaporator. The oily residue, which contains α-chlor-α-2-oxo-3β-(N-phenylacetylamino)-4β-[2-(2,2,2-trichlorethoxy-carbonyloxymethyl)-2-propylmercapto]-1-azetidinyl -acetic acid tert.-butyl ester, is twice more evaporated to dryness with 50 ml of benzene at a time, then taken up in 20 ml of dioxane and warmed to 55°C with 0.769 g of triphenylphosphine and 0.122 ml of pyridine over the course of 17 hours. After cooling, the reaction mixture is filtered through a diatomaceous earth preparation and the filtrate is evaporated to dryness. A dark brown oily residue is obtained and is chromatographed on a 25-fold amount of silica gel. α- 2-Oxo-3β-(N-phenylacetylamino)-4β-[2-(2,2,2-trichlorethoxy-carbonyloxymethyl)-2-propylmercapto]-1-azetidinyl -α-triphenylphosphoranylidene-acetic acid tert.-butyl ester, which according to a thin layer chromatogram is a single substance, is eluted with acetic acid ethyl ester. Thin layer chromatogram (silica gel): $Rf = 0.16$ (benzene/acetic acid ethyl ester, 1:1 ); infrared absorption spectrum (in methylene chloride): characteristic bands at $3.04\mu$, $3.45\mu$, $5.68\mu$, $5.96\mu$, $6.14\mu$ and $6.34\mu$; ultraviolet absorption spectrum (in ethanol): end absorption at 220 m$\mu$.

A solution, cooled to about 15°C, of 0.614 g of α-{2-oxo-3β-(N-phenylacetylamino)-4β-[2-(2,2,2-trichlorethoxy-carbonyloxymethyl)-2-propylmercapto]-1-azetidinyl}-α-triphenylphosphoranylidene-acetic acid tert.-butyl ester in 30 ml of glacial acetic acid is mixed with 6.0 g of zinc dust and 3.0 ml of water and stirred for 30 minutes at about 15°C. The zinc dust is filtered off and the filtrate is evaporated in a rotary evaporator. The residue is taken up in 250 ml of benzene and the solution is washed with 75 ml of distilled water, 75 ml of a saturated aqueous sodium hydrogen carbonate solution and 75 ml of distilled water. The aqueous phases are re-extracted with 100 ml of benzene and the combined organic extracts are dried over magnesium sulphate and evaporated. α-[4β-(2-Hydroxymethyl-2-propylmercapto)-2-oxo-3β-(N-phenylacetylamino)-1-azetidinyl]-α-triphenylphosphoranylidene-acetic acid tert.-butyl ester is obtained as a residue; thin layer chromatogram: $Rf = 0.145$ (acetic acid ethyl ester); infrared absorption spectrum (methylene chloride): characteristic bands at $3.00\mu$, $3.47\mu$, $5.68\mu$, $6.00\mu$, $6.10\mu$ and $6.61\mu$; this material is used further without purification.

EXAMPLE 41:

A solution of 2.625 g of penicillin-V in 30 ml of tetrahydrofurane is mixed with 5.31 ml of a 10 ml solution of 2 ml of triethylamine in tetrahydrofurane whilst stirring and cooling to −10°C. 3.6 ml of a 10 ml solution of 2 ml of chloroformic acid ethyl ester in tetrahydrofurane are then slowly added at −10°C and after completion of the addition the mixture is stirred for 90 minutes at −10°C to −5°C.

The reaction mixture is treated with a solution of 0.51 g of sodium azide in 5.1 ml of water, stirred for 30 minutes at 0°C to −5°C, and diluted with 150 ml of ice water. This mixture is extracted three times with methylene chloride; the organic extracts are washed with water, dried and evaporated at 25°C and under reduced pressure. The amorphous penicillin-V-azide is thus obtained as a slightly yellowish oil; infrared absorption spectrum (in methylene chloride): characteristic bands at $3.04\mu$, $4.70\mu$, $5.61\mu$, $5.82\mu$ (shoulder), $5.93\mu$, $6.26\mu$, $6.71\mu$, $8.50\mu$ and $9.40\mu$.

A solution of 2.468 g of the penicillin-V-azide in 30 ml of benzene is heated to 70°C for 30 minutes. Pure 3-isocyanato-2,2-dimethyl-6-(N-phenyloxyacetyl-amino)-penam can be obtained by evaporation of the solution under reduced pressure; infrared absorption spectrum (in methylene chloride): characteristic bands at $3.03\mu$, $4.46\mu$, $5.59\mu$, $5.93\mu$, $6.26\mu$, $6.62\mu$, $6.70\mu$, $7.53\mu$, $8.28\mu$, $8.53\mu$, $9.24\mu$ and $9.40\mu$.

The above solution of the 3-isocyanato-2,2-dimethyl-6-(N-phenyloxyacetyl-amino)-penam is mixed with 3.4 ml of a 10 ml solution of 2 ml of 2,2,2-trichlorethanol in benzene and the reaction mixture is kept at 70°C for 95 minutes. The solvent is removed under reduced pressure and the residue is purified on 40 ml of acid-washed silica gel (column). By-products are eluted with 300 ml of benzene and 300 ml of a 19:1 mixture of benzene and acetic acid ethyl ester, and the pure 2,-2-dimethyl-6-(N-phenyloxyacetyl-amino)-3-(N-2,2,2-trichlorethoxycarbonyl-amino)-penam is eluted with 960 ml of a 9:1 mixture of benzene and acetic acid ethyl ester. The product melts at 169°–171°C (decomposition); $[\alpha]_D^{20} = +83°$ (c = 1.015 in chloroform); thin layer chromatogram (silica gel): $Rf = 0.5$ in a 1:1 mixture of benzene and acetic acid ethyl ester; infrared absorption spectrum (in methylene chloride): characteristic bands at $3.05\mu$, $5.62\mu$, $5.77\mu$, $5.93\mu$, $6.27\mu$, $6.62\mu$, $6.70\mu$, $8.30\mu$, $9.23\mu$ and $9.50\mu$.

A solution of 3 g of crystalline 2,2-dimethyl-6-(N-phenyloxyacetyl-amino)-3-(N-2,2,2-trichlorethoxycarbonyl-amino)-penam in 65 ml of 90% strength aqueous acetic acid and 30 ml of dimethylformamide is mixed with 32.6 g of zinc dust over the course of 20 minutes, whilst cooling in ice, and the mixture is stirred for 20 minutes. The excess zinc is filtered off and the filter residue is washed with benzene; the filtrate is diluted with 450 ml of benzene, washed with a saturated aqueous sodium chloride solution and with water, dried and evaporated under reduced pressure. The residue is purified on a column of 45 g of acid-washed silica gel. Elution is carried out with 100 ml of benzene and 400 ml of a 9:1 mixture of benzene and acetic acid ethyl ester and apolar products are obtained. Starting material is eluted with 100 ml of a 4:1 mixture of benzene and acetic acid ethyl ester and elution with a further 500 ml of the 4:1 mixture of benzene and acetic acid ethyl ester, and with 200 ml of a 2:1 mixture of benzene and acetic acid ethyl ester yields 3-hydroxy-2,2-dimethyl-6-(N-phenyloxyacetyl-amino)-penam, which spontaneously crystallises as the hydrate and after trituration with ether saturated with water melts indistinctly in the range of 62°–85°C.

If chromatographed, but non-crystalline, 2,2-dimethyl-6-(N-phenyloxyacetyl-amino)-3-(N-2,2,2-trichlorethoxycarbonyl-amino)-penam is used and reduction is carried out in dilute acetic acid without the addition of dimethylformamide, the pure product melting at 62°–70°C is obtained; thin layer chromatogram (silica gel): Rf = 0.35 in a 1:1 mixture of benzene and acetic acid ethyl ester; infrared absorption spectrum (in methylene chloride): characteristic bands at 2.93$\mu$, 3.09$\mu$, 5.65$\mu$, 5.96$\mu$, 6.29$\mu$, 6.65$\mu$, 6.75$\mu$, 8.57$\mu$, 9.27$\mu$, 10.00$\mu$ and 11.95$\mu$.

A solution of 0.18 g of 3-hydroxy-2,2-dimethyl-6-(N-phenyloxyacetyl-amino)-penam hydrate in 5 ml of tetrahydrofurane is mixed at 0°C with 0.3 ml of a solution of sodium borohydride in 5 ml of water. The mixture is stirred for 20 minutes at 0°C, then adjusted to pH ~4 by addition of 12 drops of acetic acid, and diluted with 50 ml of methylene chloride. The organic solution is twice washed with saturated aqueous sodium chloride solution, the aqueous wash liquors are back-washed with methylene chloride, and the combined organic solutions are dried and evaporated under reduced pressure. The crystalline residue is recrystallised from a mixture of methylene chloride and ether, whereby 4$\beta$-(2-hydroxymethyl-2-propyl-mercapto)-3$\beta$-(N-phenyloxyacetyl-amino)-azetidin-2-one is obtained which after repeated recrystallisation is obtained in needles, melting point 156°–157°C; $[\alpha]_D^{20} = +130° \pm 1°$ (c = 0.708 in chloroform); infra red absorption spectrum (in methylene chloride): characteristic bands at 3.30$\mu$, 4.46$\mu$, 5.59$\mu$, 5.93$\mu$, 6.26$\mu$, 6.62$\mu$, 6.70$\mu$, 7.53$\mu$, 8.28$\mu$, 8.53$\mu$, 9.24$\mu$ and 9.40$\mu$.

A solution of 0.4 g of 4$\beta$-(2-hydroxymethyl-2-propylmercapto)-3$\beta$-(N-phenyloxyacetyl-amino)-azetidin-2-one and 0.52 g of 2,2,2-trichlorethoxy-carbonyl chloride in 6 ml of dry tetrahydrofurane is slowly mixed with a solution of 0.6 ml of pyridine in 4 ml of dry tetrahydrofurane at 0°C, whilst stirring. After completion of the addition, the mixture is stirred for 3 hours and then diluted with 100 ml of methylene chloride; the organic solution is washed with water, dried and evaporated. The residue is chromatographed on 40 g of acid-washed silica gel. By-products, mainly bis-2,2,2-trichlorethyl-carbonate, are eluted with benzene as well as 9:1 and 4:1 mixtures of benzene and acetic acid ethyl ester. 3$\beta$-(N-Phenyloxyacetyl-amino)-4$\beta$-[2-(2,2,2-trichlorethoxy-carbonyloxymethyl)-2-propylmercapto]-azetidin-2-one is eluted wtih a 1:1 mixture of benzene and acetic acid ethyl ester and recrystallised from a mixture of ether and pentane, melting point 93°–95°C; $[\alpha]_D^{20} = -6° \pm 1°$ (c = 1.17 in chloroform); infrared absorption spectrum (in methylene chloride): characteristic bands at 3.03$\mu$, 5.63$\mu$, 5.68$\mu$, 5.92$\mu$, 6.26$\mu$, 6.69$\mu$, 6.70$\mu$, 7.25$\mu$ and 8.08$\mu$.

A solution of 0.4 g of glyoxylic acid tert.-butyl ester hydrate in 5 ml of toluene is dried azeotropically by distilling off 2 ml of toluene under normal pressure. The residue is cooled to 90°C and 0.121 g of 3$\beta$-(N-phenyloxy-acetylamino)-4$\beta$-[2-(2,2,2-trichlorethoxy-carbonyloxymethyl)-2-propylmercapto]-azetidin-2-one in 2 ml of anhydrous toluene is added. The mixture is warmed at 90°C for 90 minutes; the volatile constituents are distilled off under a pressure of 0.01 mm Hg. The oily residue is taken up in a mixture of benzene and pentane and washed with water. The organic phase is dried and the solvent is distilled off under reduced pressure. The residue is chromatographed on 3.5 g of acid-washed silica gel, and the amorphous mixture of the isomers of $\alpha$-hydroxy-$\alpha$-{2-oxo-3$\beta$-(N-phenyloxyacetyl-amino)-4$\beta$-[2(-2,2,2-trichlorethoxy-carbonyloxymethyl)-2-propylmercapto]-1-azetidinyl}-acetic acid tert.-butyl ester is obtained by elution with a 4:1 mixture of benzene and acetic acid ethyl ester; infrared absorption spectrum (in methylene chloride): characteristic bands at 3.05$\mu$, 5.64$\mu$, 5.80$\mu$, 5.94$\mu$, 6.27$\mu$, 7.32$\mu$, 8.17$\mu$ and 8.69$\mu$.

A solution of 0.254 g of of $\alpha$-hydroxy-$\alpha$-{2-oxo-3$\beta$-(N-phenyloxyacetyl-amino)-4$\beta$-[2-(2,2,2-trichlorethoxy-carbonyloxymethyl)-2-propylmercapto]-1-azetidinyl}-acetic acid tert.-butyl ester in 5 ml of dioxane (dried by filtering through aluminum oxide, activity I) is cooled to 0°C and mixed with 0.320 g of polymeric Hunig base (diisopropylaminomethylene-polystyrene; manufactured by warming a mixture of 100 g of chloromethylpolystyrene [J.Am.-Chem.Soc. 85, 2149 (1963)], 500 ml of benzene, 200 ml of methanol and 100 ml of diisopropylamine to 150°C whilst shaking, filtering, washing with 1000 ml of methanol, 1000 ml of a 3:1 mixture of dioxane and triethylamine, 1000 ml of methanol and 1000 ml of methanol and drying for 16 hours at 100°C/10 mm Hg; the product neutralises 1.55 milliequivalents of hydrochloric acid per gram in a 2:1 mixture of dioxane and water) and with 0.6 ml of a solution of thionyl chloride in dry dioxane (1 ml of thionyl chloride per 10 ml of solution). After 2 hours the mixture is filtered, the filter residue is washed with dry dioxane, and the filtrate is evaporated to dryness under a high vacuum. The residue, containing $\alpha$-chloro-$\alpha$-{2-oxo-3$\beta$-(N-phenyloxyacetyl-amino)-4$\beta$-[2-(2,2,2-trichlorethoxy-carbonyloxymethyl)-2-propylmercapto]-1-azetidinyl}-acetic acid tert.-butyl ester, is dissolved in 5 ml of dioxane, 0.2 g of triphenylphosphine and 0.2 g of the polymeric Hunig base are added, and the mixture is stirred for 16 hours at 55°C. It is filtered, the filter residue is washed with benzene, and the filtrate is evaporated under reduced pressure. The residue is chromatographed on 15 g of acid-washed silica gel. The fractions eluted with a 4:1 mixture of benzene and acetic acid ethyl ester and the first fractions eluted with a 2:1 mixture of benzene and acetic acid ethyl ester contain unreacted starting material, whilst the further fractions eluted with the 2:1 mixture of benzene and acetic acid ethyl ester and the fractions eluted with a 1:1 mixture of the same solvents contain amorphous $\alpha$-{2-oxo-3$\beta$-(N-phenyloxyacetyl-amino)-4$\beta$-[2-(2,2,2-trichlorethoxy-carbonyloxy-methyl)-2-propylmercapto]-1-azetidinyl}-$\alpha$-triphenylphosphoranylidene-acetic acid tert.-butyl ester infrared absorption spectrum (in methylene chloride): characteristic bands at 3.03$\mu$, 5.69$\mu$, 5.94$\mu$, 6.2$\mu$ and 6.9$\mu$, and the further fractions show a little triphenylphosphine oxide.

A solution of 0.127 g of $\alpha$- 2-oxo-3$\beta$-(N-phenyloxyacetyl-amino)-4$\beta$-[2-(2,2,2-trichlorethoxycarbonyloxymethyl)-2-propylmercapto]-1-azetidinyl -$\alpha$-triphenylphosphoranylidene-acetic acid tert.-butyl ester in 10 ml of 90% strength aqueous acetic acid is mixed with 1.0 g of zinc dust and stirred for 30 minutes at 0°C. The mixture is filtered, the filtrate is diluted with 100 ml of benzene and washed with water, a dilute aqueous sodium hydrogen carbonate solution and water, and the aqueous solutions are reextracted with benzene. The combined organic solutions are evaporated under reduced pressure and yield the amorphous $\alpha$-[4$\beta$-(2-hydroxymethyl-2-propylmercapto)-2-oxo-3$\beta$-(N-phenyloxyacetylamino)-1-azetidinyl]-$\alpha$-triphenylphosphoranylidene-acetic acid tert.-butyl ester as a colourless gummy substance; infrared absorption spectrum (in methylene chloride): characteristic bands at 2.96μ, 5.69μ, 5.97μ, 6.12μ, 6.55μ, 6.69μ, 7.33μ, 7.50μ, 8.55μ, 9.03μ, 9.23μ and 9.40μ.

EXAMPLE 42:

A suspension of 0.5 g of crude 6-amino-penicillanic acid in 4 ml of chloroform (freshly distilled over phosphorus pentoxide) is treated with 1 ml of hexamethyldisilazane of formula $[(CH_3)_3Si]_2NH$ and 1 ml of chloroform which has been dried over phosphorus pentoxide; the reaction mixture is boiled under reflux for 2½ hours with exclusion of atmospheric moisture, then cooled to 0°C, and after addition of 1.7 ml of a 10 ml solution of 2 ml of triethylamine in chloroform is treated with 0.385 g of distilled fluoroformic acid tert.-butyl ester. The mixture is kept for 30 minutes at 0°C and then for 90 minutes at room temperature, and is diluted with cold methylene chloride. The organic solution is washed with cold aqueous 10% strength citric acid and water, with the aqueous wash liquors being backwashed with cold methylene chloride. The combined organic extracts are twice extracted with a dilute aqueous sodium hydrogen carbonate solution and immediately after being separated off are acidified with citric acid in the presence of methylene chloride and at 0°C. The organic phase is separated off, dried and evaporated; pure amorphous 6-(N-tert.-butoxycarbonylamino)-penicillanic acid is thus obtained; infrared absorption spectrum (in methylene chloride): characteristic bands at 3.04μ, 5.63μ, 5.82μ, 6.67μ, 7.32μ and 8.60μ; it is immediately used further, without purification.

The 6-(N-tert.-butoxy-carbonyl-amino)-penicillanic acid obtained is dissolved in 10 ml of methylene chloride and treated with 0.43 ml of a 10 ml solution of 2 ml of triethylamine in methylene chloride. On evaporation, the 6-(N-carbo-tert.-butoxy-amino)-penicillanic acid triethyl-ammonium salt is obtained as an amorphous residue; infrared spectrum (in methylene chloride): characteristic bands at 3.05μ, 5.67μ, 5.85μ, 6.17μ, 6.67μ, 7.32μ and 8.53μ.

A solution of 0.226 g of the 6-(N-tert.-butoxycarbonyl-amino)-penicillanic acid triethylammonium salt in 5 ml of tetrahydrofurane is mixed at −10°C with 0.26 ml of a 10 ml solution of 2 ml of chloroformic acid ethyl ester in tetrahydrofurane. After 90 minutes' stirring at −5°C to −10°C, the mixture is treated with a solution of 0.04 g of sodium azide in 0.4 ml of water. The mixture is stirred for a further 30 minutes at −5°C to 0°C, then diluted with 20 ml of ice water, and extracted with methylene chloride. The organic extract is dried and evaporated under reduced pressure at a temperature below 25°c; crude 6-(N-tert.-butoxycarbonylamino)-penicillanic acid azide is thus obtained as the residue; infrared absorption spectrum (in methylene chloride): characteristic bands at 3.03μ, 4.70μ, 5.62μ, 5.83μ, 6.16μ, 7.32μ, 8.60μ and 9.40μ.

The crude product obtained above is dissolved in 5 ml of benzene, the solution is stirred for 5 minutes at 70°C, and a small amount of the solvent is evaporated; according to the infrared spectrum (in methylene chloride: characteristic bands at 3.03μ, 4.48μ, 5.61μ, 5.83μ, 6.67μ, 7.31μ, 7.55μ and 8.62μ) the rearrangement to give 3-isocyanato-2,2-dimethyl-6-(N-tert.-butoxycarbonyl-amino)-penam is complete. The warm benzene solution is mixed with 0.2 ml of 2,2,2-trichlorethanol; the reaction mixture is stirred for a further 90 minutes at 70°C and then evaporated under reduced pressure. 2,2-Dimethyl-6-(N-tert.-butoxycarbonyl-amino)-3-(N-2,2,2-trichlorethoxycarbonyl-amino)-penam is thus obtained as a crystalline product, which after recrystallisation from a mixture of ether and pentane melts at 166°–167°C; infrared absorption spectrum (in methylene chloride): characteristic bands at 3.04μ, 5.63μ, 5.81μ, 5.84μ, 6.69μ, 7.34μ, 8.65μ, 9.16μ and 9.59μ.

A solution of 0.5 g of 2-(N-carbo-2,2,2-trichlor-2,2-dimethyl-6-(N-tert.-butoxycarbonyl-amino)-3-(N-2,2,2-trichlorethoxy-carbonyl-amino)-penam in 5 ml of tert.-butanol is diluted with 4 ml of acetic acid and 1 ml of water. After cooling in an icebath, 5 g of zinc dust are added in small portions over the course of 15 minutes, whilst stirring. The mixture is stirred for a further 30 minutes at 0°C and is then filtered into a receiver containing 70 ml of saturated aqueous sodium chloride solution. The residue is rinsed with methylene chloride and the aqueous phase of the filtrate is extracted with the same solvent. The organic extracts are washed with saturated aqueous sodium chloride solution, dried and evaporated under reduced pressure. The crude product thus obtained can be purified by chromatography on 10 g of acid-washed silica gel, first pre-washing with a 9:1 mixture of benzene and acetic acid ethyl ester and then eluting the 3-hydroxy-2,2-dimethyl-6-(N-tert.-butoxycarbonyl-amino)-penam and as a colourless oil with the same solvent mixture and with a 4:1 mixture of benzene and acetic acid ethyl ester. This crystallises from a mixture of ether and pentane, melting point 106°–110°C (sintering from 100°C onwards); $[\alpha]_D^{20} = \pm 115° \pm 1°$ (c = 0.858 in chloroform); thin layer chromatogram (silica gel): Rf~0.53 in a 1:1 mixture of benzene and acetic acid ethyl ester; infrared absorption spectrum (in methylene chloride): characteristic bands at 2.91μ, 3.04μ, 5.64μ, 5.84μ, 6.68μ, 7.33μ and 8.60μ.

A solution of 0.08 g of 3-hydroxy-2,2-dimethyl-6-(N-tert.-butoxycarbonyl-amino)-penam in 5 ml of tetrahydrofurane is mixed at 0°C with 0.13 ml of a solution of 0.38 g of sodium borohydride in 5 ml of water. The reaction mixture is stirred for 20 minutes at room temperature, then acidified with 5 drops of acetic acid and diluted with methylene chloride. The organic phase is washed with a saturated aqueous sodium chloride solution, dried and evaporated under reduced pressure. The residue is chromatographed on 0.5 g of acid-washed silica gel, with apolar by-products being eluted with 5 ml each of benzene and of 9:1 and 4:1 mixtures of benzene and acetic acid ethyl ester, and the amorphous 4β-(2-hydroxymethyl-2-propylmercapto)-3β-(N-tert.-butoxycarbonyl-amino)-azetidin-2-one being eluted with 10 ml of a 1:1 mixture of benzene and acetic acid ethyl ester and with 5 ml of acetic acid ethyl ester; infrared absorption spectrum (in methylene chloride): characteristic bands at 3.03μ , 5.63μ, 5.83μ, 6.63μ, 7.31μ, 8.60μ and 9.43μ.

Treatment of 4β-(2-hydroxymethyl-2-propylmercapto)-3β-(N-tert.-butoxycarbonyl-amino)-azetidin-2-one with 2,2,2-trichlorethoxycarbonyl chloride in the presence of pyridine in accordance with the process indicated in Example 39 yields 3β-(N-tert.-butoxycarbonyl-amino)-4β-[2-(2,2,2-trichlorethoxycarbonylmethyl)-2-propylmercapto]-azetidin-2-one, which can be converted by treatment with the glyoxylic acid tert.tubyl ester hydrate according to the process indicated in example 39 to give the α-hydroxy-α-{2-oxo-4β-[2-(2,2,2-trichlorethoxy-carbonyloxymethyl)-2-propylmercapto]-3β-(N-tert.butoxycarbonyloxymethyl)-2-propylmercapto}-3-β-(N-tert.-butoxycarbonyl-amino)-1-azetidinyl}-acetic acid tert.butyl ester. In this, the secondary hydroxyl group is converted into a chlorine atom by treatment with thionyl chloride analagously to the process described in example 39, and the α-chloro-α-{2-oxo-4β-[2-(2,2,2-trichorethoxycarbonyloxymethyl)-2-propylmercapto]-3β-(N-tert.-butoxycarbonyl-amino)-1-azetidinyl}-acetic acid tert.-butyl ester is reacted with triphenylphosphine to give the α-{2-oxo-4β-[2-(2,2,2-trichlorethoxycarbonyloxy-methyl)-2-propylmercapto]-3β-(N-tert.-butoxycarbonyl-amino)-1-azetidinyl}-α-triphenylphosphoranylidene-acetic acid tert.-butyl ester. In this, the 2,2,2-trichlorethoxycarbonyl group is split by treatment with zinc in 90% aqueous acetic acid according to the process described in example 39, whereby the α-[4β-(2-hydroxymethyl-2-propylmercapto)-2-oxo-3β-(N-tert.-butoxycarbonyl-amino)-1-azetidinyl]-α-triphenylphosphoranylidene-acetic acid tert.-butyl ester is obtained.

EXAMPLE 43:

Capsules each containing 0.5 g of 2,2-dimethyl-7-(D-α-phenylglycyl)-amino-ceph-3-em-4-carboxylic acid are prepared as follows:

Formula (for 10000 Capsules):
2,2-dimethyl-7-(D-α-phenylglycyl)-amino-
ceph-3-em-4-carboxylic acid        5000 g
Wheat starch                        350 g
Magnesium stearate                  150 g The ingredients are thoroughly mixed and filled into gelatine capsules No. 0 or 00.

What is claimed is:

1. In a process for the manufacture of 7-amino-ceph-3-em-4-carboxylic acid compounds of the formula

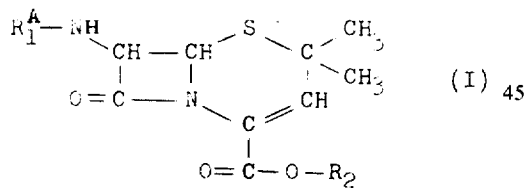

in which $R_1^A$ is a member selected from the group consisting of phenylacetyl in which phenyl is unsubstituted or substituted by hydroxy, phenylglycyl, in which phenyl is unsubstituted or substituted by a member selected from the group consisting of hydroxy and halogen in which glycyl portion the amino group is unsubstituted or substituted by sulfo, carbamoyl, guanidino-carbonyl, 2,2,2-trichloroethoxycarbonyl, 2-chloroethoxycarbonyl, 2-bromoethoxy-carbonyl, 2-iodoethoxycarbonyl, tert.-butyloxycarbonyl or phenacyl-oxycarbonyl; α-carboxyphenylacetyl and α-carboxy-2-thienylacetyl, in which carboxy is a member selected from the group consisting of carboxy and carboxy esterified by lower alkyl; α-sulfo-phenylacetyl, in which sulfo is a member selected from the group consisting of sulfo and sulfo esterified by lower alkyl; and tert.-butyloxycarbonyl, 2,2,2-trichloroethylcarbonyl, 2-iodoethoxycarbonyl and 2-bromoethoxycarbonyl, and $R_2$ is hydrogen or a group $R_2^A$, which is a member selected from the group consisting of tert.-butyl, diphenylmethyl, 2,2,2-trichloroethyl, 2-iodoethyl, 2-chloroethyl, 2-bromoethyl, 4-methoxy-benzyl and 4-nitro-benzyl, the step which comprises reacting a compound of the formula

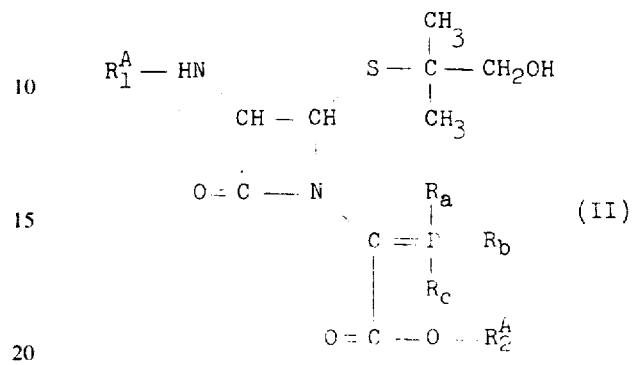

in which each of $R_a$, $R_b$ and $R_c$ is a member selected from the group consisting of lower alkyl and phenyl, $R_1^A$ has the meaning given above, whereby functional groups present in $R_1^A$ are in the free or protected form, and $R_2^A$ has the meaning given above, is reacted with dimethylsulfoxide in the presence of an acid anhydride as a reagent with dehydrating or water-absorbing properties.

2. A process as claimed in claim 1, wherein a lower alkanecarboxylic acid is used.

3. A process as claimed in claim 2, wherein acetic acid anhydride is used.

4. A process as claimed in claim 1, wherein a 1:1-mixture of the sulphoxide oxidising agent and of the anhydride is used.

5. A 7-amino-ceph-3-em-4-carboxylic acid compound of the formula

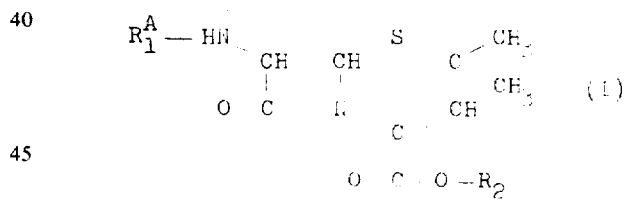

in which $R_1^A$ is a member selected from the group consisting of phenylacetyl in which phenyl is unsubstituted or substituted by hydroxy, phenylglycyl in which phenyl is unsubstituted or substituted by a member selected from the group consisting of hydroxy and halogeno and in which glycyl portion the amino group is unsubstituted or substituted by sulfo, carbamoyl, guanidino carbonyl, 2,2,2-trichloroethoxycarbonyl, 2-chloroethoxycarbonyl, 2-bromoethoxy-carbonyl, 2-iodoethoxycarbonyl, tert.-butyloxycarbonyl or phenacyl-oxycarbonyl; α-carboxyphenylacetyl and α-carboxy-2-thienylacetyl, in which carboxy is a member selected from the group consisting of carboxy and carboxy esterified by lower alkyl; α-sulfo-phenylacetyl in which sulfo is a member selected from the grop consisting of sulfo and sulfo esterified by lower alkyl; and tert.-butyloxycarbonyl, 2,2,2-trichloroethylcarbonly, 2-iodoethoxycarbonyl and 2-bromoethoxycarbonyl, and $R_2$ is hydrogen or a group $R_2^A$, which is a member selected from the group consisting of tert.-butyl, diphenylmethyl, 2,2,2-trichloroethyl, 2-iodoethyl, 2-chloroethyl, 2-bromoethyl, 4-methoxy-benzyl and 4-nitro-benzyl, and pharmaceutically acceptable alkali group, alkaline earth group or acid addition salts thereof.

6. A compound as claimed in claim 5 and representing a member selected from the group consisting of a compound of the formula

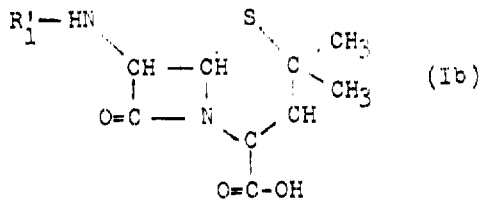

wherein $R_1'$ represents an acyl group of the formula

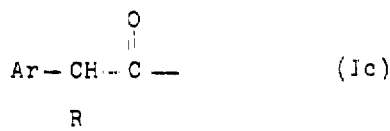

wherein Ar represents phenyl, 3- or 4-hydroxyphenyl or 3,5-dichloro-4-hydroxy-phenyl, and R represents amino, guanidinocarbonylamino, sulfonylamino, carboxy or sulfo, and an alkali group, alkaline earth group or acid addition salt thereof.

7. A compound as claimed in claim 5 and representing a member selected from the group consisting of 2,2-dimethyl-7-(N-phenylacetyl-amino)-ceph(3)em-4-carboxylic acid and an alkali group, alkaline earth group or acid addition salt thereof.

8. A compound as claimed in claim 5 and representing a member selected from the group consisting of 2,2-dimethyl-7-[N-(N-tert.-butyloxycarbonyl-D-α-phenylglycyl)-amino]-ceph(3)em-4-carboxylic acid and an alkali group, alkaline earth group or acid addition salt thereof.

9. A compound as claimed in claim 5 and representing a member selected from the group consisting of 2,2-dimethyl-7-[N-(D-α-phenylglycyl)-amino]-ceph(3)em-4-carboxylic acid and an alkali group, alkaline earth group or acid addition salt thereof.

* * * * *